(12) United States Patent
Kim et al.

(10) Patent No.: US 11,392,242 B2
(45) Date of Patent: *Jul. 19, 2022

(54) FINGERPRINT RECOGNITION TOUCH SENSOR AND ELECTRONIC APPARATUS INCLUDING THE SAME

(71) Applicant: SAMSUNG ELECTRONICS CO., LTD., Suwon-si (KR)

(72) Inventors: Jinmyoung Kim, Hwaseong-si (KR); Dongkyun Kim, Suwon-Si (KR); Jaechul Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,308

(22) Filed: Apr. 22, 2021

(65) Prior Publication Data

US 2021/0240327 A1 Aug. 5, 2021

Related U.S. Application Data

(63) Continuation of application No. 16/550,782, filed on Aug. 26, 2019, now Pat. No. 11,009,993.

(30) Foreign Application Priority Data

Jan. 28, 2019 (KR) .................. 10-2019-0010664

(51) Int. Cl.
*G06F 3/041* (2006.01)
*G06F 3/044* (2006.01)
*G06V 40/13* (2022.01)

(52) U.S. Cl.
CPC ........ *G06F 3/04164* (2019.05); *G06F 3/0446* (2019.05); *G06F 3/041661* (2019.05); *G06V 40/1306* (2022.01)

(58) Field of Classification Search
None
See application file for complete search history.

(56) References Cited

U.S. PATENT DOCUMENTS

| 8,593,416 B2 | 11/2013 | Hsieh et al. |
| 10,176,359 B2 | 1/2019 | Yoon |

(Continued)

FOREIGN PATENT DOCUMENTS

| KR | 10-2017-0016556 A | 2/2017 |
| KR | 10-2017-0135061 A | 12/2017 |
| KR | 10-2018-0090705 A | 8/2018 |

OTHER PUBLICATIONS

Communication dated Jun. 16, 2020 issued by the European Intellectual Property Office in counterpart European Application No. 20150219.2.

*Primary Examiner* — Duane N Taylor, Jr.
(74) *Attorney, Agent, or Firm* — Sughrue Mion, PLLC

(57) ABSTRACT

A touch sensor includes a plurality of parallel transmitting lines extending in a first direction, a plurality of parallel receiving lines extending in a second direction crossing the first direction, and a transmitting driver configured to, in a first mode, apply first driving signals of a first voltage, to the plurality of transmitting lines, and in a second mode, apply second driving signals of a second voltage, to the plurality of transmitting lines, the second voltage being different than the first voltage. The touch sensor further includes a signal output unit configured to receive touch signals from the plurality of receiving lines.

17 Claims, 22 Drawing Sheets

(56) References Cited

U.S. PATENT DOCUMENTS

| | | |
|---|---|---|
| 2013/0050151 A1 | 2/2013 | Tu et al. |
| 2016/0350570 A1 | 12/2016 | Han et al. |
| 2016/0350571 A1 | 12/2016 | Han et al. |
| 2017/0200037 A1 | 7/2017 | Hong et al. |
| 2018/0101711 A1* | 4/2018 | D'Souza .............. G06V 30/142 |
| 2018/0113346 A1 | 4/2018 | Han et al. |

* cited by examiner

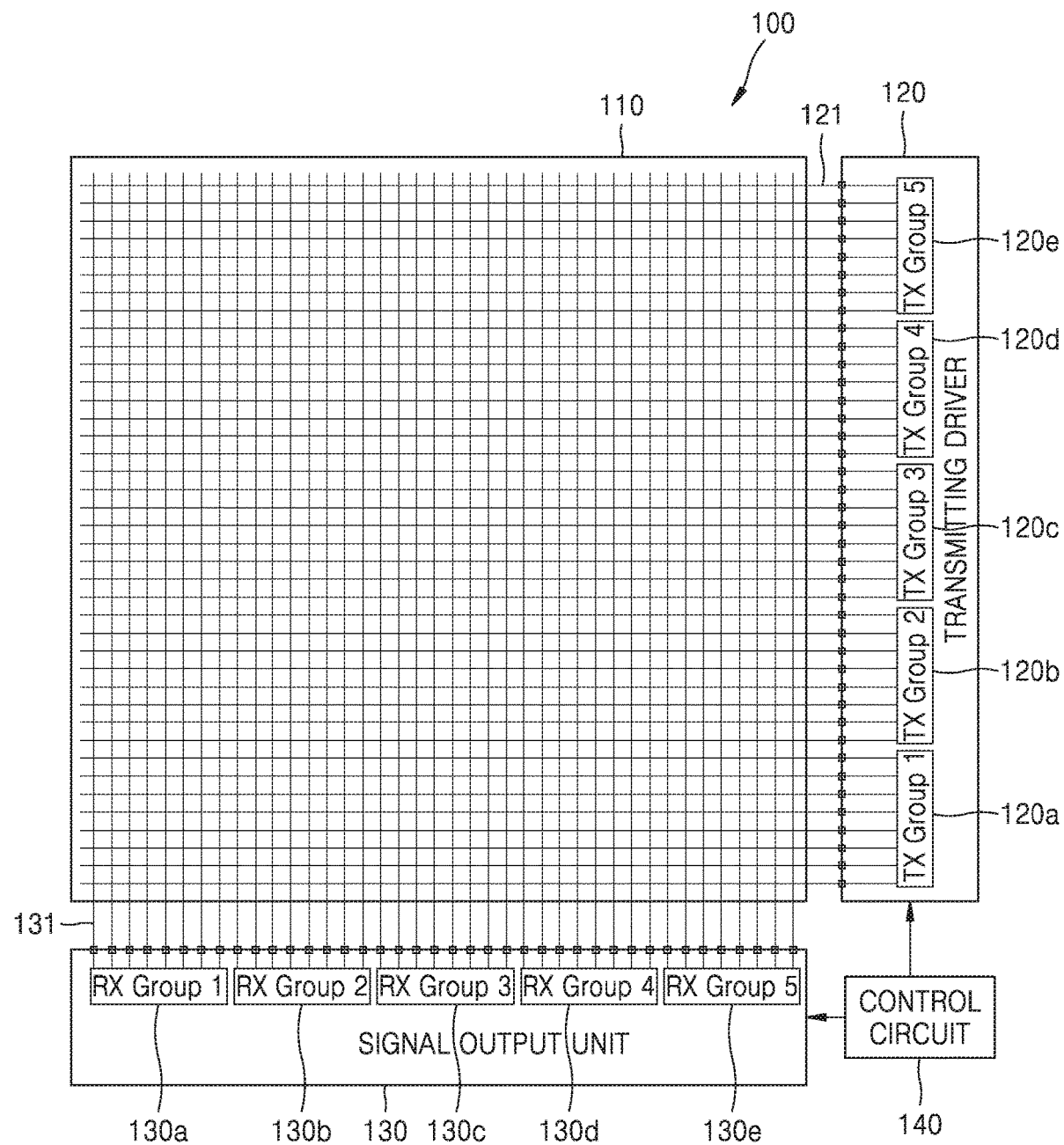

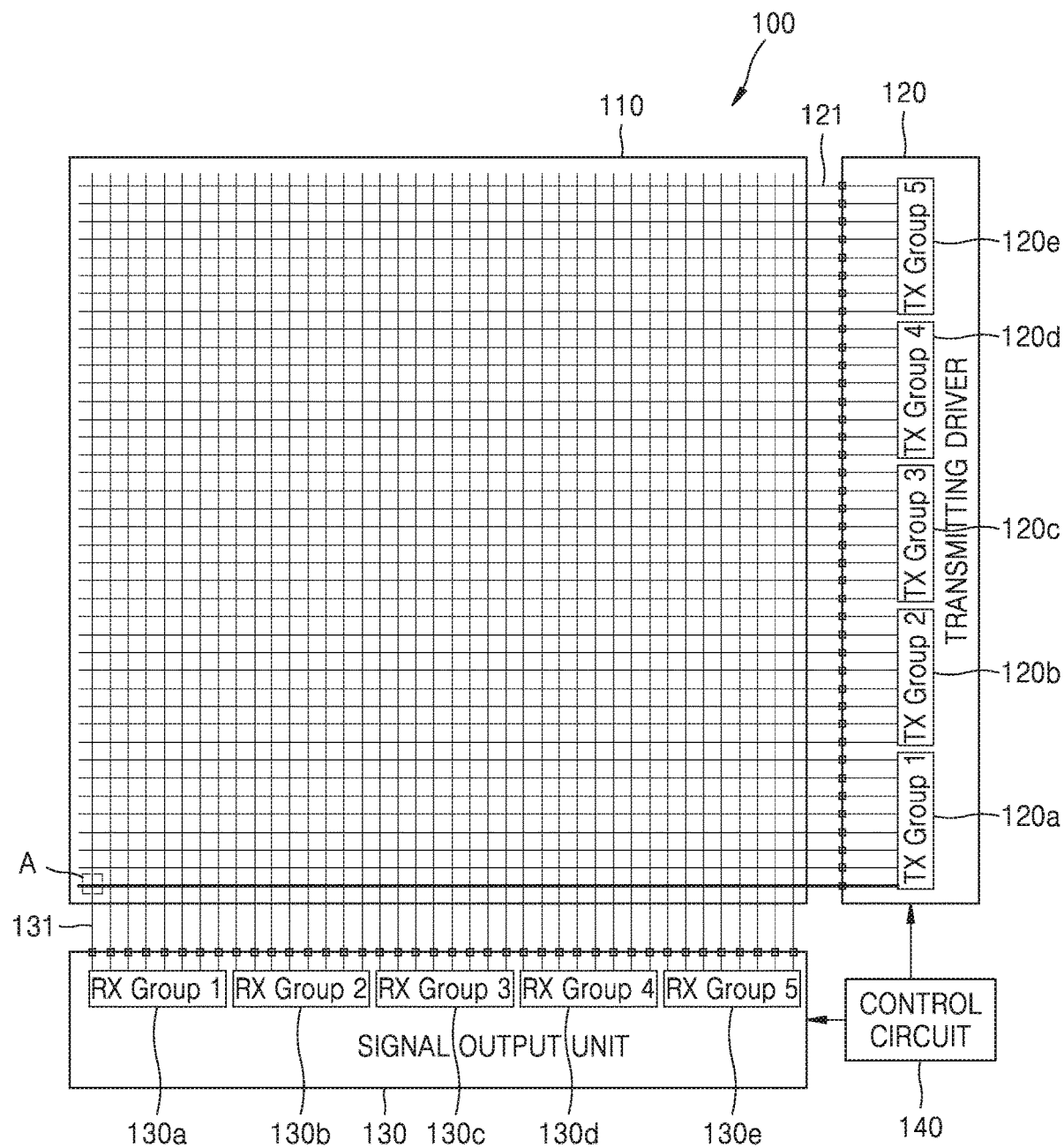

FINGERPRINT RECOGNITION TOUCH SENSOR AND ELECTRONIC APPARATUS INCLUDING THE SAME

CROSS-REFERENCE TO RELATED APPLICATIONS

This is a continuation application based on U.S. patent application Ser. No. 16/550,782, filed Aug. 26, 2019, in the US Patent and Trademark Office, which claims priority from Korean Patent Application No. 10-2019-0010664, filed on Jan. 28, 2019, in the Korean Intellectual Property Office, the disclosures of which are incorporated by reference herein in their entireties.

BACKGROUND

1. Field

Apparatuses consistent with embodiments relate to a touch sensor and an electronic apparatus including the touch sensor, and more particularly, to a fingerprint recognition touch sensor capable of performing both fingerprint recognition and touch sensing, and an electronic apparatus including the fingerprint recognition touch sensor.

2. Description of the Related Art

A touch screen is a simple and easy-to-use input device configured to recognize a touch position or related information on a screen, which a user contacts or presses by using a finger or the like, and transmit the touch position or the related information of the screen to a system. A capacitive touch screen has high transmittance, excellent durability, high touch resolution, and multi-touch capability. A touch screen panel is applied not only to mobile devices, such as smart phones, tablet personal computers (PCs), etc., but also to various electronic apparatuses, such as automatic teller machines (ATMs), automatic ticket issuing machines, navigation devices, etc.

Recently, a need for personal authentication for various mobile apparatuses and electronic apparatuses has gradually increased. Personal authentication functions using personal characteristics such as a fingerprint, a voice, a face, and an iris may be used in mobile devices, access control devices, and financial devices. Fingerprint recognition technologies of smart phones and tablet PCs according to existing methods are structured to include a fingerprint recognition module in addition to a touch screen module.

SUMMARY

According to embodiments, there is provided a touch sensor including a plurality of parallel transmitting lines extending in a first direction, a plurality of parallel receiving lines extending in a second direction crossing the first direction, and a transmitting driver configured to, in a first mode, apply first driving signals of a first voltage, to the plurality of transmitting lines, and in a second mode, apply second driving signals of a second voltage, to the plurality of transmitting lines, the second voltage being different than the first voltage. The touch sensor further includes a signal output unit configured to receive touch signals from the plurality of receiving lines.

The transmitting driver may be further configured to, in the first mode, sequentially apply one of the first driving signals of the first voltage, to each of the plurality of transmitting lines.

The transmitting driver may include a plurality of transmitting groups disposed in the second direction. Each of the plurality of transmitting groups may include adjacent ones of the plurality of transmitting lines.

The transmitting driver may be further configured to, in the second mode, sequentially apply the second driving signals of the second voltage, to each of the plurality of transmitting groups.

The plurality of transmitting groups may include a first transmitting group and a second transmitting group adjacent to the first transmitting group. The transmitting driver may be further configured to, in the second mode, apply the second driving signals of the second voltage simultaneously to first ones of the plurality of transmitting lines that are disposed in the first transmitting group, and then apply the second driving signals of the second voltage simultaneously to the second ones of the plurality of transmitting lines that are disposed in the second transmitting group.

The transmitting driver may include a plurality of transmitting circuits connected to the plurality of transmitting lines, respectively, a first voltage line configured to supply the first voltage to the plurality of transmitting circuits, and a second voltage line configured to supply the second voltage to the plurality of transmitting circuits.

The transmitting driver may be further configured to, in the first mode, connect the first voltage line to the plurality of transmitting circuits, and in the second mode, connect the second voltage line to the plurality of transmitting circuits.

The transmitting driver may be further configured to, in the first mode, sequentially and separately activate the plurality of transmitting circuits, and in the second mode, simultaneously activate ones of the plurality of transmitting circuits that are disposed in one of the plurality of transmitting groups.

The signal output unit may include a plurality of receiving groups disposed in the first direction. Each of the plurality of receiving groups may include adjacent ones of the plurality of receiving lines.

The signal output unit may include a plurality of first receiving circuits disposed to correspond to the plurality of receiving lines, respectively, and a plurality of second receiving circuits. Each of the plurality of second receiving circuits may be disposed to correspond to a respective one of the plurality of receiving groups.

The signal output unit may be further configured to, in the first mode, connect the plurality of receiving lines respectively to the plurality of first receiving circuits, and simultaneously receive the touch signals through all of the plurality of first receiving circuits respectively connected to the plurality of receiving lines.

The signal output unit may be further configured to, in the second mode, connect ones of the plurality of receiving lines that are disposed in one of the plurality of receiving groups to one of the plurality of second receiving circuits corresponding to the one of the plurality of receiving groups, and receive the touch signals through the one of the plurality of second receiving circuits connected to the ones of the plurality of receiving lines.

Each of the plurality of first receiving circuits may include a first feedback capacitor having a first capacitance, and each of the plurality of second receiving circuits may include a second feedback capacitor having a second capacitance greater than the first capacitance.

The transmitting driver may be further configured to, in a third mode, apply third driving signals of a third voltage lower than the first voltage and higher than the second voltage, to first ones of the plurality of transmitting lines that are sequentially disposed in one of the plurality of transmitting groups, and then apply the third driving signals of the third voltage to second ones of the plurality of transmitting lines that are sequentially disposed in the one of the plurality of transmitting groups.

The transmitting driver may include a plurality of transmitting circuits connected to the plurality of transmitting lines, respectively, a first voltage line configured to supply the first voltage to the plurality of transmitting circuits, a second voltage line configured to supply the second voltage to the plurality of transmitting circuits, and a third voltage line configured to supply the third voltage to the plurality of transmitting circuits.

The transmitting driver may be further configured to, in the first mode, connect the first voltage line to the plurality of transmitting circuits, in the second mode, connect the second voltage line to the plurality of transmitting circuits, and in the third mode, connect the third voltage line to the plurality of transmitting circuits.

The transmitting driver may be further configured to, in the first mode, sequentially and separately activate the plurality of transmitting circuits, in the second mode, simultaneously activate first ones of the plurality of transmitting circuits that are disposed in the one of the plurality of transmitting groups, and in the third mode, simultaneously activate second ones of the plurality of transmitting circuits that are connected to the first ones of the plurality of transmitting lines in the one of the plurality of transmitting groups, and then simultaneously activate third ones of the plurality of transmitting circuits that are connected to the second ones of the plurality of transmitting lines.

The signal output unit may include a plurality of receiving groups disposed in the first direction, each of the plurality of receiving groups may include adjacent ones of the plurality of receiving lines, and the signal output unit may further include a plurality of first receiving circuits disposed to correspond to the plurality of receiving lines, respectively, and a plurality of second receiving circuits disposed to correspond to the plurality of receiving groups, respectively.

The signal output unit may be further configured to, in the third mode, receive the touch signals by connecting first ones of the plurality of receiving lines that are sequentially disposed in one of the plurality of receiving groups, to one of the plurality of second receiving circuits corresponding to the one of the plurality of receiving groups, and then receive the touch signals by connecting second ones of the plurality of receiving lines that are sequentially disposed in the one of the plurality of receiving groups, to the one of the plurality of second receiving circuits corresponding to the one of the plurality of receiving groups.

The signal output unit may include a plurality of receiving groups disposed in the first direction, and each of the plurality of receiving groups may include adjacent ones of the plurality of receiving lines. The signal output unit further may include a plurality of first receiving circuits disposed to correspond to the plurality of receiving lines, respectively, a second receiving circuit disposed to correspond to first ones of the plurality of receiving lines that are sequentially disposed in each of the plurality of receiving groups, and a third receiving circuit disposed to correspond to second ones of the plurality of receiving lines that are sequentially disposed in each of the plurality of receiving groups.

The signal output unit may be further configured to, in the third mode, receive the touch signals by connecting the first ones of the plurality of receiving lines sequentially disposed in each of the plurality of receiving groups, to the second receiving circuit, while receiving the touch signals by connecting the second ones of the plurality of receiving lines sequentially disposed in each of the receiving groups, to the third receiving circuit.

The signal output unit may include a plurality of receiving groups disposed in the first direction, each of the plurality of receiving groups may include adjacent ones of the plurality of receiving lines, and the signal output unit may include a plurality of receiving circuits disposed to correspond to the plurality of receiving lines, respectively.

The signal output unit may be further configured to, in the first mode, connect the plurality of receiving lines respectively to the plurality of receiving circuits, and simultaneously receive the touch signals through all of the plurality of first receiving circuits respectively connected to the plurality of receiving lines, and in the second mode, receive the touch signals by connecting first ones of the plurality of receiving lines that are disposed in one of the plurality of receiving groups, to any first one of the plurality of receiving circuits in the one of the plurality of receiving groups. The signal output unit may be further configured to, in the third mode, receive the touch signals by connecting second ones of the plurality of receiving lines that are sequentially disposed in the one of the plurality of receiving groups, to any second one of the plurality of receiving circuits in the one of the plurality of receiving groups, and connecting third ones of the plurality of receiving lines that are sequentially disposed in the plurality of receiving groups, to another one of the plurality of receiving circuits in the one of the plurality of receiving groups.

The first mode may be a fingerprint recognition mode, the second mode may be a low resolution touch sensing mode, and the third mode may be a high resolution touch sensing mode.

According to embodiments, there is provided an electronic apparatus including a display panel, and a touch sensor including a plurality of parallel transmitting lines extending in a first direction, a plurality of parallel receiving lines extending in a second direction crossing the first direction, and a transmitting driver configured to, in a first mode, apply first driving signals of a first voltage, to the plurality of transmitting lines, and in a second mode, apply second driving signals of a second voltage, to the plurality of transmitting lines, the second voltage being different than the first voltage. The touch sensor further includes a signal output unit configured to receive touch signals from the plurality of receiving lines.

According to embodiments, there is provided a touch sensor including a plurality of parallel transmitting lines extending in a first direction, a plurality of parallel receiving lines extending in a second direction crossing the first direction, and a transmitting driver configured to, in a fingerprint recognition mode, apply first driving signals of a first voltage, to the plurality of transmitting lines, in a low resolution touch sensing mode, apply second driving signals of a second voltage, to the plurality of transmitting lines, the second voltage being different than the first voltage, and in a high resolution touch sensing mode, apply third driving signals of a third voltage, to the plurality of transmitting lines, the third voltage being lower than the first voltage and higher than the second voltage. The touch sensor further includes a signal output unit configured to receive touch signals from the plurality of receiving lines.

The transmitting driver may be further configured to, in the fingerprint recognition mode, sequentially apply one of the first driving signals of the first voltage, to each of the plurality of transmitting lines, in the low resolution touch sensing mode, sequentially apply the second driving signals of the second voltage, to each of a plurality of transmitting groups disposed in the second direction, each of the plurality of transmitting groups including adjacent ones of the plurality of transmitting lines, and in the high resolution touch sensing mode, sequentially apply the third driving signals of the third voltage, to each sub-group of the plurality of transmitting lines that is included in each of the plurality of transmitting groups.

The signal output unit may be further configured to, in the fingerprint recognition mode, simultaneously receive the touch signals from all of the plurality of receiving lines, in the low resolution touch sensing mode, receive the touch signals from one of a plurality of receiving groups disposed in the first direction, each of the plurality of receiving groups including adjacent ones of the plurality of receiving lines, and in the high resolution touch sensing mode, sequentially receive the touch signals from each sub-group of the plurality of receiving lines that is included in the one of the plurality of receiving groups.

BRIEF DESCRIPTION OF THE DRAWINGS

FIG. 1 is a diagram schematically illustrating an example of a structure of a touch sensor according to embodiments.

FIGS. 2A and 2B are diagrams illustrating an example of an operation of a touch sensor in a fingerprint recognition mode, according to embodiments.

DETAILED DESCRIPTION

Figure 2B:
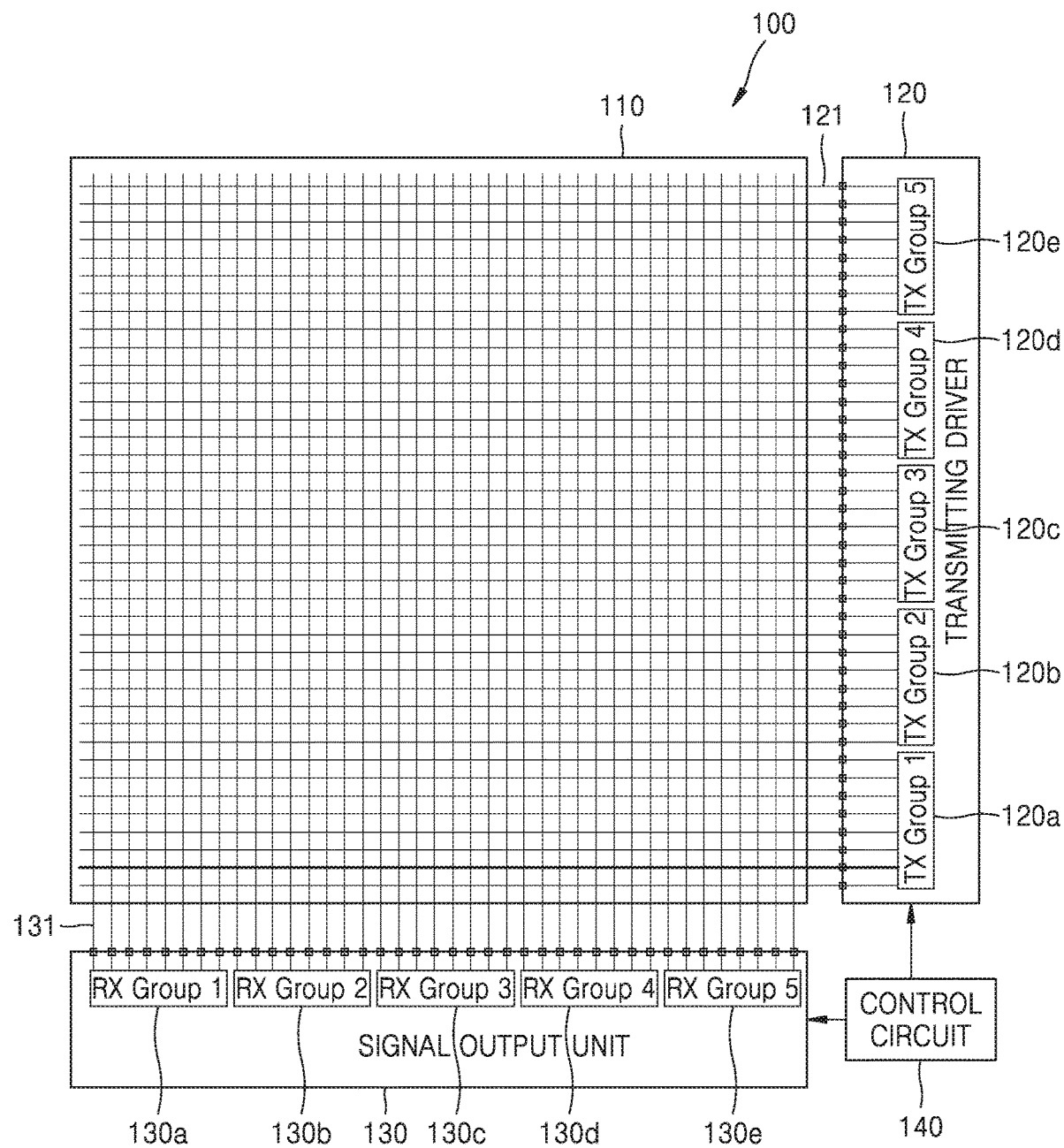

Hereinafter, a fingerprint recognition touch sensor and an electronic apparatus including the fingerprint recognition touch sensor will be described in detail with reference to the accompanying drawings. In the drawings hereinafter, like reference numerals refer to like elements and a size of each of components in the drawings may be exaggerated for clarity and convenience of description. Also, embodiments described hereinafter are only examples and various modifications may be possible based on the embodiments. Also, in a layered structure described hereinafter, an expression, such as "on" or "above," may denote not only an element directly above/below/left to/right to another element by contacting the other element, but also an element above/below/left to/right to another element without contacting the other element. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram schematically illustrating an example of a touch sensor 100 according to embodiments. Referring to FIG. 1, the touch sensor 100 may include a touch panel 110 in which a plurality of transmitting lines 121 that are parallel to each other and a plurality of receiving lines 131 that are parallel to each other are disposed to cross each other, a transmitting driver 120 configured to apply driving signals to the plurality of transmitting lines 121, and a signal output unit 130 configured to receive touch signals from the plurality of receiving lines 131. Also, the touch sensor 100 may further include a control circuit 140 configured to control operations of the transmitting driver 120 and the signal output unit 130. In the drawings, the transmitting driver 120, the signal output unit 130, and the control circuit 140 are separately illustrated for convenience of description. However, the transmitting driver 120, the signal output unit 130, and the control circuit 140 may be realized as one electronic circuit. Also, the control circuit 140 may be disposed in an electronic apparatus including the touch sensor 100. The touch panel 110 may be disposed on a display panel of an electronic apparatus or may be integrally manufactured with the display panel of the electronic apparatus.

The plurality of transmitting lines 121 parallel to each other may extend long in a first direction. Also, the plurality of receiving lines 131 parallel to each other may extend long in a second direction crossing the plurality of transmitting lines 121. An end of each of the plurality of receiving lines 131 may be connected to the signal output unit 130. The plurality of transmitting lines 121 and the plurality of receiving lines 131 may be disposed in different layers of the touch panel 110 in a height direction to not contact each other. Also, a dielectric may be disposed between the layer on which the plurality of transmitting lines 121 are disposed and the layer on which the plurality of receiving lines 131 are disposed. Thus, a node in which each of the plurality of transmitting lines 121 and each of the plurality of receiving lines 131 cross each other may operate as a capacitor.

The touch sensor 100 may sense a touch operation based on, for example, a capacitance method. In this case, self capacitance or mutual capacitance may be changed in the nodes in which the plurality of transmitting lines 121 and the plurality of receiving lines 131 cross each other, via a touch input or a fingerprint input, and a coordinate of the touch input or an image of a touch fingerprint may be calculated based on the changed capacitance in the plurality of touched nodes. Thus, the nodes in which the transmitting lines 121 and the receiving lines 131 cross each other may function as pixels for sensing a touch input or a fingerprint input. In the drawing, the plurality of transmitting lines 121 and the plurality of receiving lines 131 are indicated by using thin solid lines. However, actually, a plurality of transparent electrode patterns may be disposed along each of the plurality of transmitting lines 121 and the plurality of receiving lines 131.

Also, the touch sensor 100 may be configured to perform both fingerprint recognition and touch sensing. To obtain a resolution that is sufficient to accurately recognize a pattern of a fingerprint, the transmitting lines 121 and the receiving lines 131 may be disposed at very narrow intervals, compared to a general touch sensor configured to sense only a touch operation. For example, the transmitting lines 121 and the receiving lines 131 may be disposed at intervals of about 50 μm to about 70 μm.

The touching sensing operation sensing a touch operation does not require high resolution, compared to the fingerprint recognition operation. When the touch sensing operation is performed by using the same method as the fingerprint recognition operation, power consumption of the touch sensor 100 may be increased and a time taken to scan the whole area of the touch panel 110 may be increased. Thus, the touch sensor 100 may be divided into an operation in a fingerprint recognition mode and an operation in a touch sensing mode, and the touch sensor 100 may differently operate in the fingerprint recognition mode and the touch sensing mode.

To this end, according to these embodiments, the plurality of transmitting lines 121 may be divided into a plurality of groups and the plurality of receiving lines 131 may be divided into a plurality of groups. For example, the transmitting driver 120 of the touch sensor 100 may include a plurality of transmitting groups 120a, 120b, 120c, 120d, and 120e disposed in the second direction in which the plurality of transmitting lines 121 are disposed. Each of the transmitting groups 120a, 120b, 120c, 120d, and 120e may include the plurality of transmitting lines 121 sequentially disposed to be adjacent to each other. Likewise, the signal output unit 130 of the touch sensor 100 may include a plurality of receiving groups 130a, 130b, 130c, 130d, and 130e disposed in the first direction in which the plurality of receiving lines 131 are disposed. Each of the receiving groups 130a, 130b, 130c, 130d, and 130e may include the plurality of receiving lines 131 sequentially disposed to be adjacent to each other.

For example, for convenience, FIG. 1 illustrates that the transmitting driver 120 includes the five transmitting groups 120a, 120b, 120c, 120d, and 120e, one transmitting group 120a, 120b, 120c, 120d, or 120e includes eight transmitting lines 121, the signal output unit 130 includes the five receiving groups 130a, 130b, 130c, 130d, and 130e, and one receiving group 130a, 130b, 130c, 130d, or 130e includes eight receiving lines 131. However, this is only an example, and the actual number of transmitting groups, the actual number of receiving groups, the actual number of transmitting lines 121, and the actual number of receiving lines 131 may be much greater than the example. Also, the number of transmitting lines 121 assigned to one transmitting group 120a, 120b, 120c, 120d, or 120e and the number of receiving lines 131 assigned to one receiving group 130a, 130b, 130c, 130d, or 130e may be four, ten, twelve, or more, rather than eight. Also, the number of transmitting lines 121 assigned to one transmitting group 120a, 120b, 120c, 120d, or 120e and the number of receiving lines 131 assigned to one receiving group 130a, 130b, 130c, 130d, or 130e may be different from each other.

In the fingerprint recognition mode, the touch sensor 100 may sequentially apply a driving signal to each of the transmitting lines 121, without taking into account the transmitting groups 120a, 120b, 120c, 120d, and 120e.

FIGS. 2A and 2B are diagrams illustrating an example of an operation of the touch sensor 100 in a fingerprint recognition mode, according to embodiments. Referring to FIG. 2A, the transmitting driver 120 may apply a driving signal to the first transmitting line 121 indicated by a thick solid line and may not apply driving signals to the remaining transmitting lines 121, under control of the control circuit 140. Next, referring to FIG. 2B, the transmitting driver 120 may apply a driving signal to the second transmitting line 121 indicated by a thick solid line and may not apply driving signals to the remaining transmitting lines 121. Based on this method, the transmitting driver 120 may sequentially apply driving signals to the transmitting lines 121 in an order from the first transmitting line 121 to the last transmitting line 121 under control of the control circuit 140. In this case, as illustrated in "A" in FIG. 2A, an area in which one transmitting line 121 and one receiving line 131 cross each other may be a sensing unit.

Figure 3A:
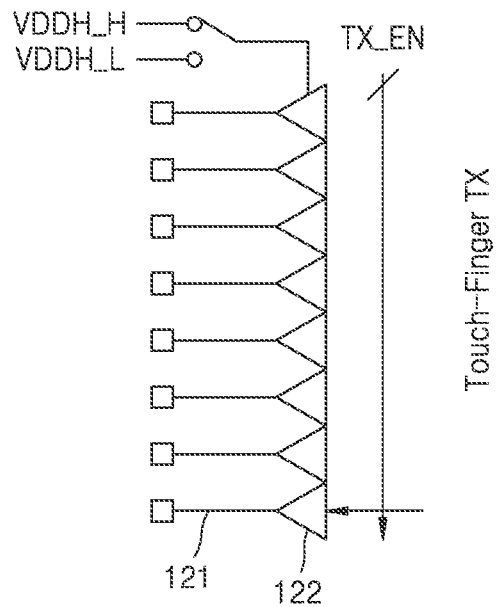
FIGS. 3A and 3B are circuit diagrams illustrating an example of an operation of transmitting circuits disposed in a transmitting driver in a fingerprint recognition mode, according to embodiments.
Figure 3B:
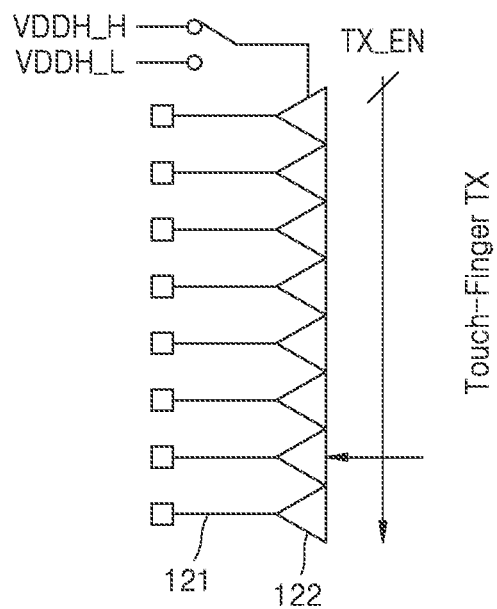

FIGS. 3A and 3B are circuit diagrams illustrating an example of an operation of transmitting circuits (Touch-Finger TX) 122 disposed in the transmitting driver 120 in a fingerprint recognition mode, according to embodiments. Referring to FIGS. 3A and 3B, the transmitting driver 120 may include the plurality of transmitting circuits 122, a first voltage line VDDH_H supplying a first voltage to the plurality of transmitting circuits 122, and a second voltage line VDDH_L supplying a second voltage to the plurality of transmitting circuits 122. Each of the transmitting circuits 122 may be connected to one transmitting line 121 corresponding thereto and may apply a driving signal to the corresponding transmitting line 121. Thus, the number of transmitting circuits 122 in the transmitting driver 120 may be the same as the number of transmitting lines 121. The first voltage line VDDH_H may provide a relatively high voltage to the transmitting circuits 122, and the second voltage line VDDH_L may provide a relatively low voltage to the transmitting circuits 122.

Referring to FIG. 3A, the first transmitting circuit 122 may be activated in response to a transmitting control signal TX_EN of the control circuit 140. Simultaneously, the control circuit 140 may connect the first voltage line VDDH_H providing a relatively high voltage, to the transmitting circuits 122. Then, the first transmitting circuit 122, which is activated, may apply the high voltage received from the first voltage line VDDH_H to the first transmitting line 121 connected thereto, as a driving signal. Thus, as illustrated in FIG. 2A, the driving signal of a high voltage may be applied to the first transmitting line 121.

Next, referring to FIG. 3B, the second transmitting circuit 122 may be activated in response to a transmitting control signal TX_EN of the control circuit 140. Then, the second transmitting circuit 122, which is activated, may apply the high voltage received from the first voltage line VDDH_H to the second transmitting line 121 connected thereto, as a driving signal. Thus, as illustrated in FIG. 3B, the driving signal of a high voltage may be applied to the second transmitting line 121.

In the finger recognition mode, an area of the sensing unit illustrated in "A" is small, and thus, mutual capacitance may be less. Thus, to obtain a high signal to noise ratio (SNR) in the fingerprint recognition mode, the driving signal of the high voltage may be transmitted to the transmitting lines 121 by connecting the first voltage line VDDH_H to the transmitting circuits 122. By doing so, a sensing sensitivity may be increased to increase the accuracy of fingerprint recognition.

Figure 4:
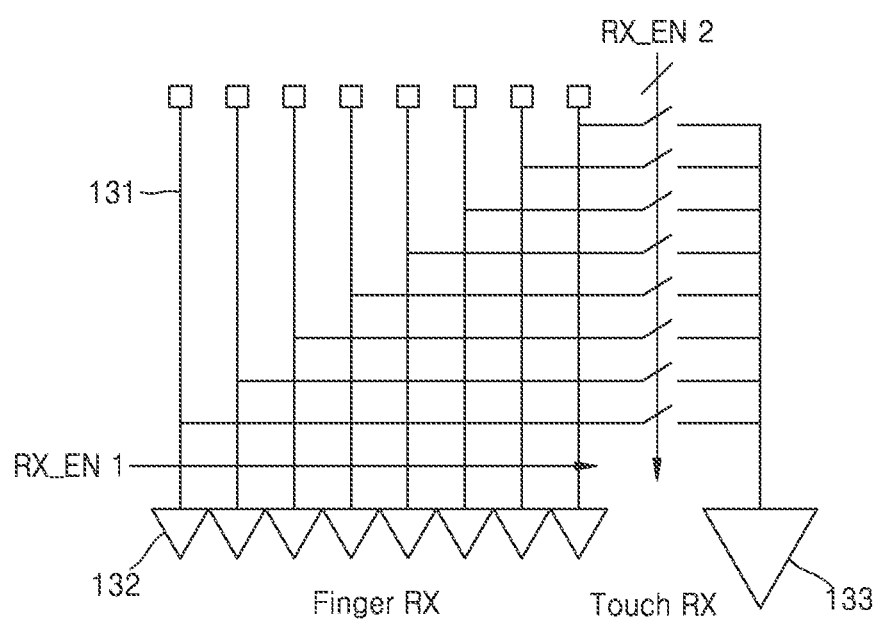
FIG. 4 is a circuit diagram illustrating an example of an operation of receiving circuits disposed in a signal output unit in a fingerprint recognition mode, according to embodiments.

FIG. 4 is a circuit diagram illustrating an example of an operation of receiving circuits disposed in the signal output unit 130 in a fingerprint recognition mode, according to embodiments. FIG. 4 illustrates the receiving circuits disposed in one receiving group 130a, 130b, 130c, 130d, or 130e of the signal output unit 130. Referring to FIG. 4, the signal output unit 130 may include a plurality of fingerprint recognition receiving circuits (Finger RX) 132 and a plurality of touch sensing receiving circuits (Touch RX) 133. Each of the fingerprint recognition receiving circuits 132 may be connected to one receiving line 131 corresponding thereto and may receive a touch signal generated due to a change $\Delta C_M$ in mutual capacitance from the connected receiving line 131 connected thereto. Thus, the total number of fingerprint recognition receiving circuits 132 may be the same as the total number of receiving lines 131 in the signal output unit 130.

The touch sensing receiving circuits 133 may be disposed such that one touch sensing receiving circuit 133 corresponds to each of the plurality of receiving groups 130a, 130b, 130c, 130d, and 130e. In other words, one touch sensing receiving circuit 133 may be disposed in each of the receiving groups 130a, 130b, 130c, 130d, and 130e. Thus, the total number of touch sensing receiving circuits 133 in the signal output unit 130 may be the same as the total number of receiving groups 130a, 130b, 130c, 130d, and 130e. One touch sensing receiving circuit 133 may be connected to all of the receiving lines 131 disposed in the receiving group 130a, 130b, 130c, 130d, or 130e corresponding thereto.

In the fingerprint recognition mode, the signal output unit 130 may separately and simultaneously receive touch signals from all of the receiving lines 131. To this end, the control circuit 140 may connect all the fingerprint recognition receiving circuits 132 in the signal output unit 130 to the receiving lines 131 corresponding thereto, through a first receiving control signal RX_EN1. Also, the control circuit 140 may disconnect the touch sensing receiving circuits 133 from the receiving lines 131 corresponding thereto, through a second receiving control signal RX_EN2. By doing so, the touch signals generated in the nodes between one transmitting line 121 to which the driving signal is applied and the plurality of receiving lines 131 crossing the transmitting line 121 may be separately sensed.

In the fingerprint recognition mode, the driving signal is sequentially applied to each of the plurality of transmitting lines 121 according to this method, so that the touch signals may be separately received from the plurality of receiving lines 131. As described above, because the area of the node A in which one transmitting line 121 and one receiving line 131 cross each other is small, the touch panel 110 may be scanned via high resolution so that a fingerprint may be precisely recognized. Also, because the voltage of the driving signals applied to the transmitting lines 121 is high, the accuracy of the fingerprint recognition may be improved.

Figure 5A:
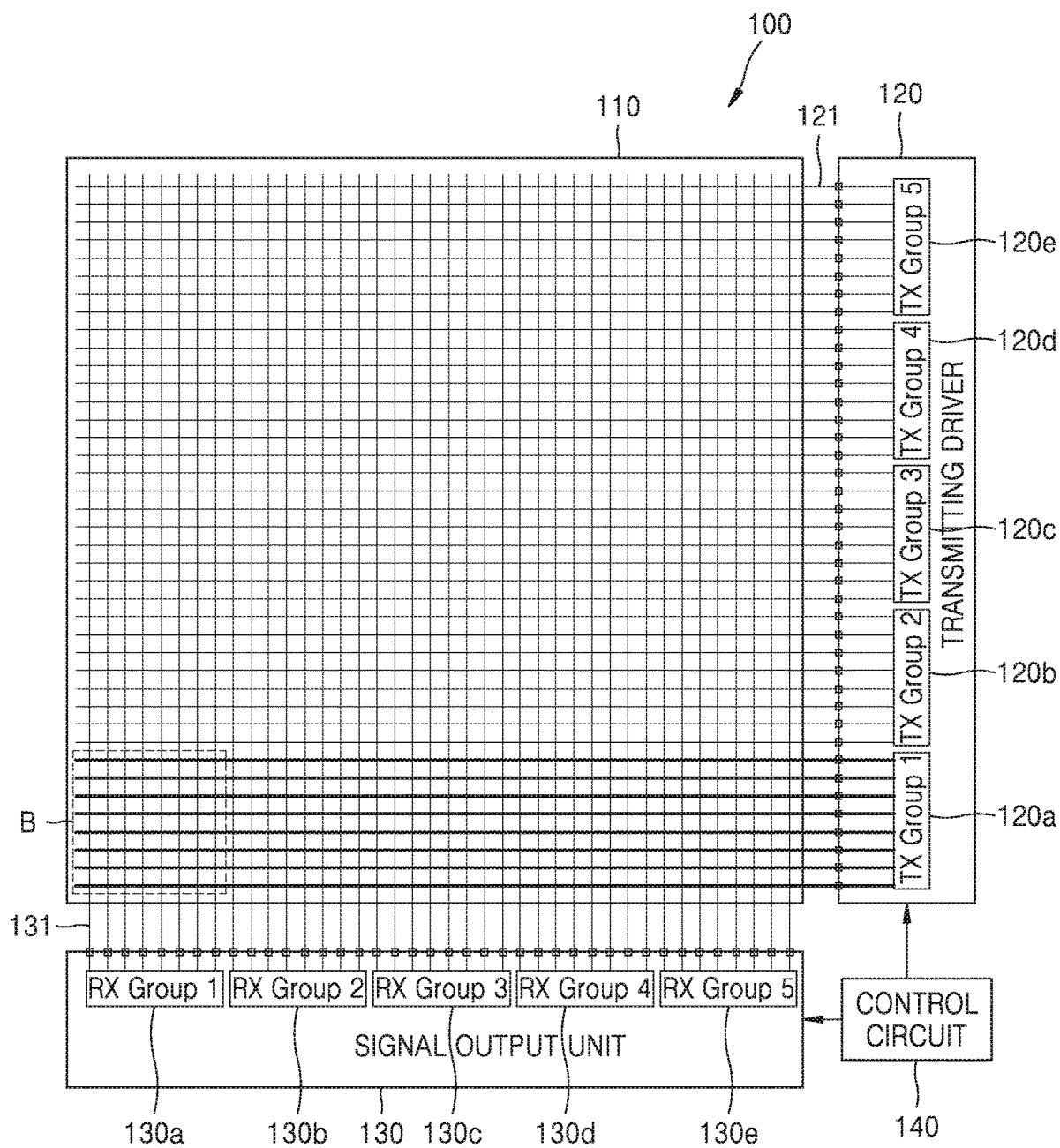
FIGS. 5A and 5B are diagrams illustrating an example of an operation of a touch sensor in a touch sensing mode, according to embodiments.
Figure 5B:
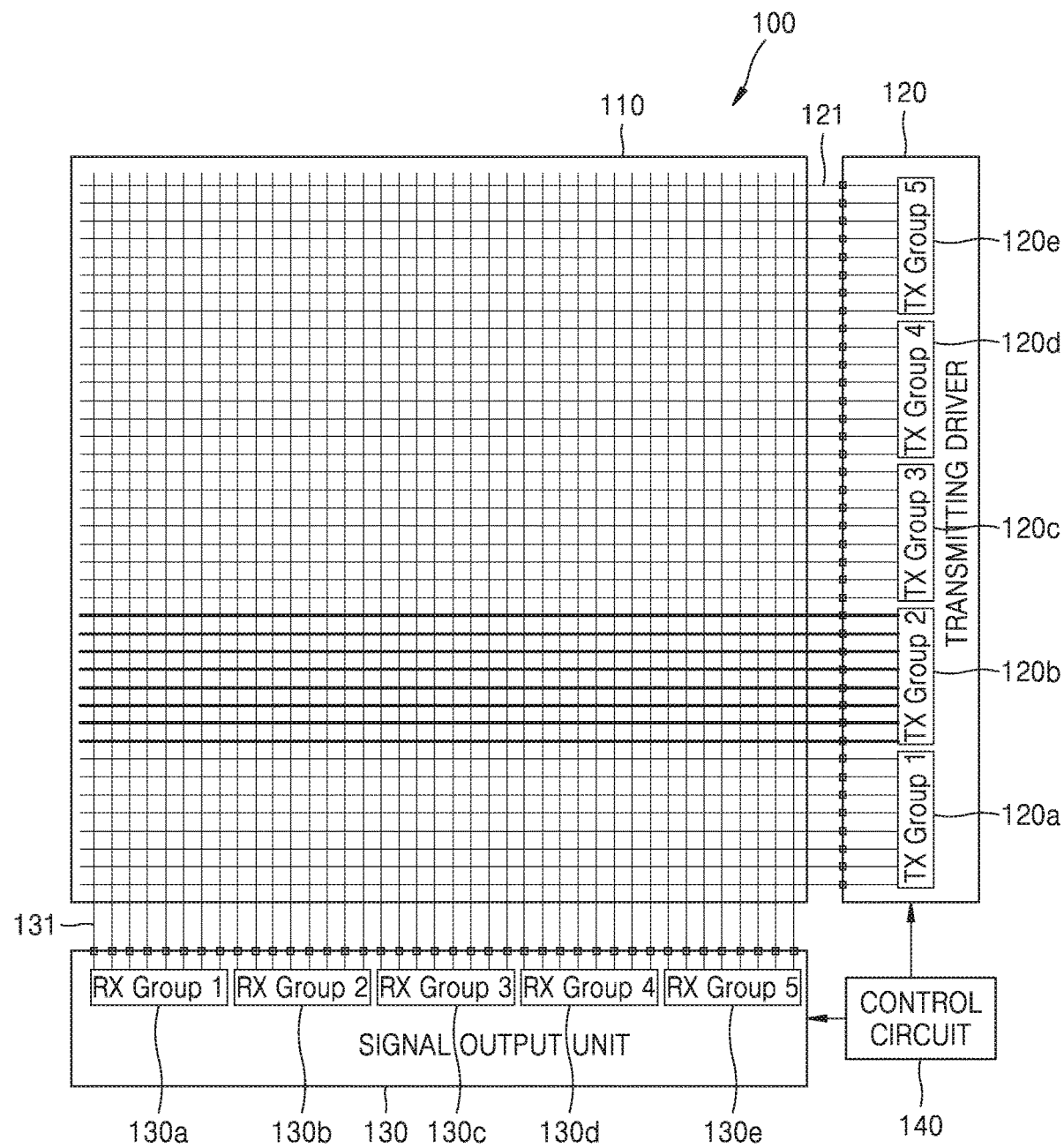

FIGS. 5A and 5B are diagrams illustrating an example of an operation of the touch sensor 100 in a touch sensing mode, according to embodiments. Referring to FIG. 5A, the transmitting driver 120 may simultaneously apply driving signals to all of the transmitting lines 121 indicated by thick solid lines in the first transmitting group 120a and may not apply driving signals to the transmitting lines 121 in the remaining transmitting groups 120b, 120c, 120d, and 120e, under control of the control circuit 140. Next, referring to FIG. 5B, the transmitting driver 120 may simultaneously apply driving signals to all of the transmitting lines 121 indicated by thick solid lines in the second transmitting group 120b and may not apply driving signals to the transmitting lines 121 in the remaining transmitting groups 120a, 120c, 120d, and 120e. Based on this method, the transmitting driver 120 may sequentially apply the driving signals to each of the transmitting groups 120a, 120b, 120c, 120d, and 120e from the first transmitting group 120a to the last transmitting group 120e under control of the control circuit 140. In this case, as illustrated in "B" in FIG. 5A, an area in which one transmitting group 120a, 120b, 120c, 120d, or 120e crosses one receiving group 130a, 130b, 130c, 130d, or 130e may be a sensing unit.

Figure 6:
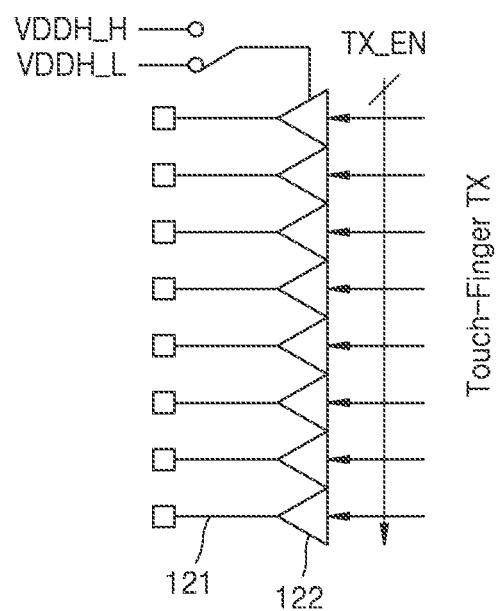
FIG. 6 is a circuit diagram illustrating an example of an operation of transmitting circuits disposed in a transmitting driver in a touch sensing mode, according to embodiments.

FIG. 6 is a circuit diagram illustrating an example of an operation of the transmitting circuits (Touch-Finger TX) 122 disposed in the transmitting driver 120 in a touch sensing mode, according to embodiments. FIG. 6 illustrates the transmitting circuits 122 disposed in one transmitting group 120a, 120b, 120c, 120d, or 120e of the transmitting driver 120. Referring to FIG. 6, in the operation illustrated in FIG. 5A, all transmitting circuits 122 in the first transmitting group 120a may be simultaneously activated in response to a transmitting control signal TX_EN of the control circuit 140. Then, the driving signals may be simultaneously applied to all transmitting lines 121 in the first transmitting group 120a. Then, in the operation illustrated in FIG. 5B, all transmitting circuits 122 in the second transmitting group 120b may be simultaneously activated in response to a transmitting control signal TX_EN of the control circuit 140. Then, the driving signals may be simultaneously applied to all transmitting lines 121 in the second transmitting group 120b.

Also, in the touch sensing mode, the control circuit 140 may connect the second voltage line VDDH_L providing a relatively low voltage, to the transmitting circuits 122. Then, the transmitting circuits 122 that are activated may apply the low voltage received from the second voltage line VDDH_L to the transmitting lines 121 connected thereto, as the driving signals. Thus, the driving signals of the low voltage may be applied to the transmitting lines 121.

In the touch sensing mode, an area of the sensing unit illustrated in "B" is large, and thus, mutual capacitance may be increased. For example, when one transmitting group 120a, 120b, 120c, 120d, or 120e includes eight transmitting lines 121 and one receiving group 130a, 130b, 130c, 130d, or 130e includes eight receiving lines 131, a mutual capacitance in the touch sensing mode may be approximately 64 times a mutual capacitance in the fingerprint recognition mode. Because of this aspect, an intensity of a touch signal may be greatly increased in the touch sensing mode to generate a great load to the signal output unit 130 processing the touch signal. Thus, to reduce the intensity of the touch signal in the touch sensing mode, the driving signals of the low voltage may be provided to the transmitting lines 121 by connecting the second voltage line VDDH_L to the transmitting circuits 122. For example, a first voltage supplied by the first voltage line VDDH_H and a second voltage supplied by the second voltage line VDDH_L may be determined such that a change in mutual capacitance due to a touch operation in the fingerprint recognition mode is equal to a change in mutual capacitance due to a touch operation in the touch sensing mode ($\Delta C_M = \Delta V \cdot C_M$).

In the touch sensing mode, each of the receiving groups 130a, 130b, 130c, 130d, and 130e of the signal output unit 130 may simultaneously receive the touch signal. In other words, one receiving group 130a, 130b, 130c, 130d, or 130e may receive one touch signal.

Figure 7:
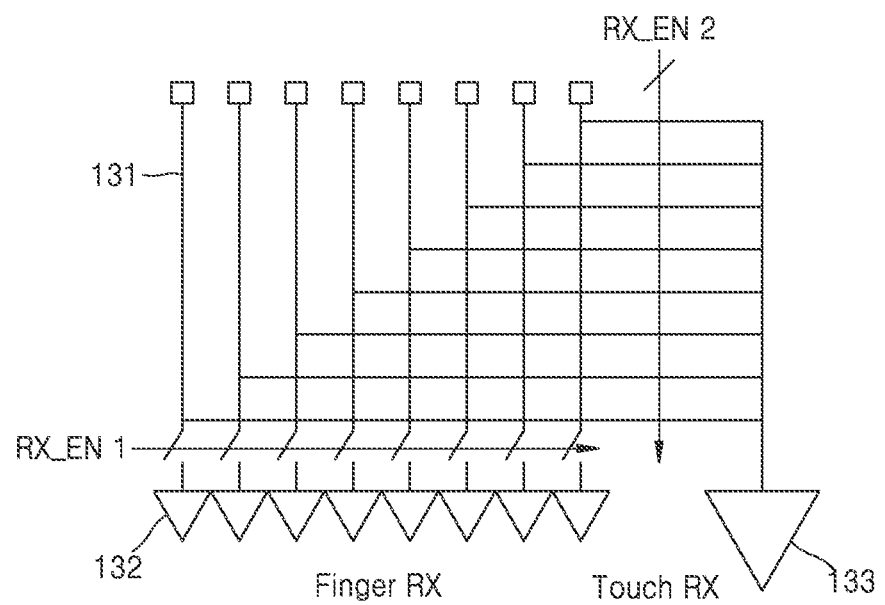
FIG. 7 is a circuit diagram illustrating an example of an operation of receiving circuits disposed in a signal output unit in a touch sensing mode, according to embodiments.

FIG. 7 is a circuit diagram illustrating an example of an operation of the fingerprint recognition receiving circuits (Finger RX) 132 and the touch sensing receiving circuits (Touch RX) 133 disposed in the signal output unit 130 in a touch sensing mode, according to embodiments. FIG. 7 illustrates the fingerprint recognition receiving circuits 132 and the touch sensing receiving circuits 133 disposed in one receiving group 130a, 130b, 130c, 130d, or 130e in the signal output unit 130.

Referring to FIG. 7, the signal output unit 130 may receive a touch signal by connecting the plurality of receiving lines 131 disposed in one receiving group 130a, 130b, 130c, 130d, or 130e to one touch sensing receiving circuit 133, in the touch sensing mode. To this end, the control circuit 140 may disconnect all of the fingerprint recognition receiving circuits 132 in the signal output unit 130 from the receiving lines 131 corresponding thereto, respectively, through a first receiving control signal RX_EN1. Also, the control circuit 140 may connect the touch sensing receiving circuits 133 to the receiving lines 131 corresponding thereto through a second receiving control signal RX_EN2. By doing so, one touch sensing receiving circuit 133 disposed in one receiving group 130a, 130b, 130c, 130d, or 130e may receive the touch signal from all of the receiving lines 131 disposed in the corresponding one receiving group 130a, 130b, 130c, 130d, or 130e. Based on this method, the touch signals generated in the nodes between one transmitting group 120a, 120b, 120c, 120d, or 120e to which the driving signal is applied and the plurality of receiving groups 130a, 130b, 130c, 130d, and 130e crossing the transmitting group 120a, 120b, 120c, 120d, or 120e may be separately sensed.

As described above, the touch signal may be received through the fingerprint recognition receiving circuits 132 in the fingerprint recognition mode and the touch signal may be received through the touch sensing receiving circuits 133 in the touch sensing mode. The fingerprint recognition receiving circuits 132 and the touch sensing receiving circuits 133 may have the same structure, but may include capacitors having different capacitances from each other.

Figure 8:
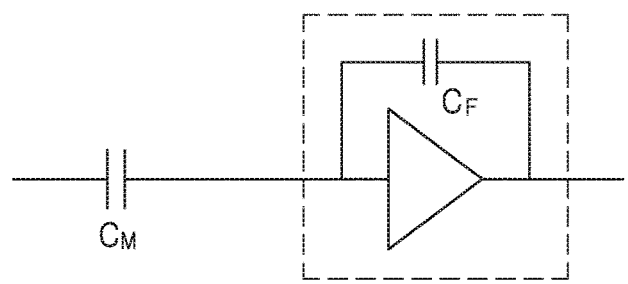
FIG. 8 is a circuit diagram illustrating a structure of receiving circuits according to embodiments.

FIG. 8 is a circuit diagram illustrating a structure of the fingerprint recognition receiving circuits 132 and the touch sensing receiving circuits 133, according to embodiments. Referring to FIG. 8, each of the fingerprint recognition receiving circuits 132 and the touch sensing receiving circuits 133 may include a feedback capacitor $C_F$ connected to an input end and an output end of an amplifier. In FIG. 8, $C_M$ is a mutual capacitance capacitor formed in nodes in which the transmitting lines 121 and the receiving lines 131 cross each other. As described above, because the mutual capacitance in the touch sensing mode and the mutual capacitance in the fingerprint recognition mode are different from each other, the capacitance of the feedback capacitor $C_F$ of the fingerprint recognition receiving circuits 132 and the capacitance of the feedback capacitor $C_F$ of the touch sensing receiving circuits 133 may be determined by taking this aspect into account.

When the fingerprint recognition receiving circuits 132 and the touch sensing receiving circuits 133 have the feedback capacitors $C_F$ having the same capacitance, a ratio between a first voltage supplied through the first voltage line VDDH_H and a second voltage supplied through the second voltage line VDDH_L may be the same as a ratio between the mutual capacitance in the touch sensing mode and the mutual capacitance in the fingerprint recognition mode. For example, when one transmitting group 120a, 120b, 120c, 120d, or 120e includes eight transmitting lines 121 and one receiving group 130a, 130b, 130c, 130d, or 130e includes eight receiving lines 131, the first voltage may be approximately 64 times the second voltage. In this case, the first voltage may be excessively high.

The intensity of the touch signal is proportional to the change in the mutual capacitance and inversely proportional to the capacitance of the feedback capacitor $C_F$ (that is, Vout∝$\Delta V \cdot C_M / C_F$), and thus, a difference between the first voltage and the second voltage may be decreased by selecting the capacitance of the feedback capacitor $C_F$ of the touch sensing receiving circuits 133 to be greater than the capacitance of the feedback capacitor $C_F$ of the fingerprint recognition receiving circuits 132. For example, when the capacitance of the feedback capacitor $C_F$ of the touch sensing receiving circuits 133 is selected to be eight times the capacitance of the feedback capacitor $C_F$ of the fingerprint recognition receiving circuits 132, the first voltage may be eight times the second voltage. However, the numerical values described above are given for helping understand the disclosure. The number of transmitting lines 121 in one transmitting group 120a, 120b, 120c, 120d, or 120e, the number of receiving lines 131 in one receiving group 130a, 130b, 130c, 130d, or 130e, the ratio between the capacitance of the feedback capacitor $C_F$ of the fingerprint recognition receiving circuits 132 and the capacitance of the feedback capacitor $C_F$ of the touch sensing receiving circuits 133, and the ratio between the first voltage and the second voltage may be variously selected according to a design of the touch sensor 100.

As described in detail, the touch sensor 100 according to these embodiments may perform both the touch sensing and the fingerprint recognition. In the fingerprint recognition mode, the driving voltage may be increased to increase sensitivity, and in the touch sensing mode, the driving voltage may be decreased and all of the transmitting lines 121 and the receiving lines 131 may be used to improve the accuracy, precision, and linearity of the touch sensing operation.

When performing an operation of scrolling a screen or selecting a screen area in the touch sensing mode, low resolution may not cause inconvenience. However, when performing an operation of writing and inputting a letter or a number via a touch operation, it may be better to have high resolution. Thus, the touch sensing may be performed by dividing each of the transmitting groups 120a, 120b, 120c, 120d, and 120e and each of the receiving groups 130a, 130b, 130c, 130d, and 130e into at least two, to increase the resolution of the touch sensing operation. Hereinafter, the touch sensing mode based on this group division will be referred to as a high resolution touch sensing mode and the touch sensing mode described with reference to FIGS. 5A through 7 will be referred to as a low resolution touch sensing mode.

Figure 9:
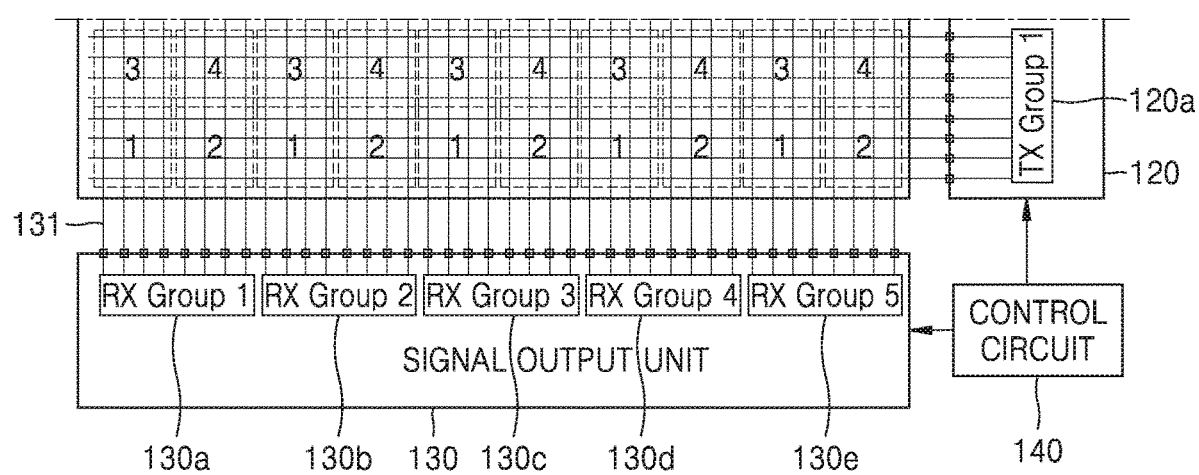
FIG. 9 is a diagram illustrating an example of an order in which a touch operation for each of areas on a touch panel is sensed in a high resolution touch sensing mode, according to embodiments.
Figure 10:
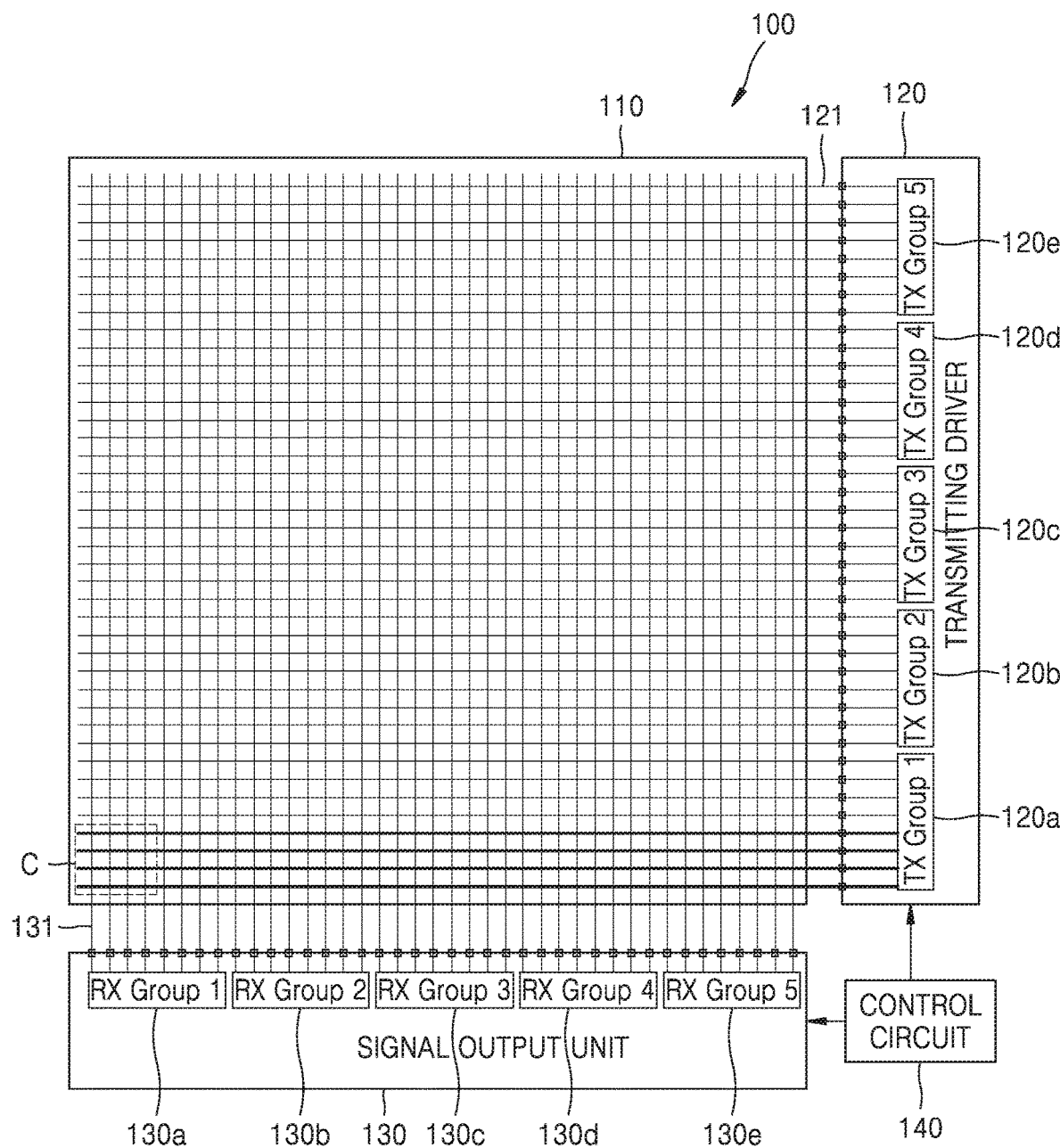
FIGS. 10, 11, 12A, 12B, 13 and 14 are diagrams illustrating an example of an operation of a touch sensor in a high resolution touch sensing mode, according to embodiments.

FIG. 9 is a diagram illustrating an example of an order in which a touch operation for each area of the touch panel 110 is sensed, in the high resolution touch sensing mode, according to embodiments. Referring to FIG. 9, the touch sensing operation may be performed by dividing each of the transmitting groups 120a, 120b, 120c, 120d, and 120e into two parts and dividing each of the receiving groups 130a, 130b, 130c, 130d, and 130e into two parts. By doing so, the sensing unit illustrated in "B" in FIG. 5A is divided into four parts, and thus, the high resolution touch sensing mode may have four times the resolution of the low resolution touch sensing mode. In the high resolution touch sensing mode, the four divided areas may be scanned, for example, based on an order of the number illustrated in FIG. 9.

FIGS. 10, 11, 12A, 12B, 13 and 14 are diagrams illustrating an example of an operation of the touch sensor 100 in the high resolution touch sensing mode, according to embodiments. First, referring to FIG. 10, the transmitting driver 120 may simultaneously apply driving signals to a first portion of the transmitting lines 121 in the first transmitting group 120a and may not apply driving signals to the remaining transmitting lines 121, under control of the control circuit 140. For example, as indicated by a thick solid line in FIG. 10, the driving signals may be simultaneously applied to only the first portion of the transmitting lines 121 sequentially disposed in the first transmitting group 120a.

Figure 11:
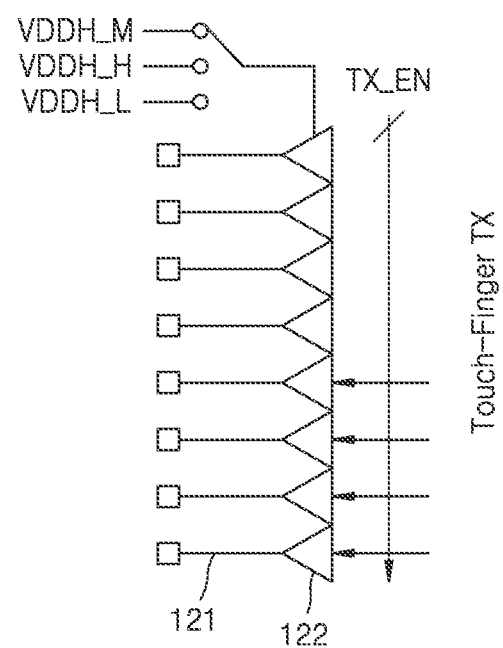

Referring to FIG. 11, a first portion of the transmitting circuits Touch-Finger TX) 122 sequentially disposed in the first transmitting group 120a may be simultaneously activated in response to a transmitting control signal TX_EN of the control circuit 140. Then, the driving signals may be simultaneously applied to the first portion of the transmitting lines 121 connected to the first portion of the activated transmitting circuits 122 in the first transmitting group 120a. In this case, as illustrated in "C" in FIG. 10, an area in which a portion of each transmitting group 120a, 120b, 120c, 120d, or 120e and a portion of each receiving group 130a, 130b, 130c, 130d, or 130e cross each other may be a sensing unit.

The transmitting driver 120 may further include a third voltage line VDDH_M supplying a third voltage between the first voltage and the second voltage to the plurality of transmitting circuits 122. In the high resolution touch sensing mode, the control circuit 140 may connect the third voltage line VDDH_M to the transmitting circuits 122. Then, the activated transmitting circuits 122 may apply the third voltage received through the third voltage line VDDH_M to the transmitting lines 121 connected thereto, as the driving signals. Thus, the driving signals of the third voltage may be applied to the transmitting lines 121.

An area of the sensing unit illustrated in "C" in the high resolution touch sensing mode is less than an area of the sensing unit illustrated in "B" in the low resolution touch sensing mode, and thus, as described above, the mutual capacitance of the sensing unit illustrated in "C" in the high resolution touch sensing mode may be correspondingly less than the mutual capacitance of the sensing unit illustrated in "B" in the low resolution touch sensing mode. For example, when each of the transmitting groups 120a, 120b, 120c, 120d, and 120e is divided into two parts and each of the receiving groups 130a, 130b, 130c, 130d, and 130e is divided into two parts in the high resolution touch sensing mode, the mutual capacitance in the high resolution touch sensing mode may be ¼ times the mutual capacitance in the low resolution touch sensing mode. Thus, the third voltage may be higher than the second voltage to obtain a high SNR by maintaining the change in the mutual capacitance in the high resolution touch sensing mode to be the same as that in the low resolution touch sensing mode. Also, the third voltage may be lower than the first voltage supplied in the fingerprint recognition mode. For example, when each of the transmitting groups 120a, 120b, 120c, 120d, and 120e is divided into two parts and each of the receiving groups 130a, 130b, 130c, 130d, and 130e is divided into two parts, the third voltage may be four times the second voltage. However, the numerical values described above are only examples for helping understand the disclosure. Based on the number of parts into which each transmitting group 120a, 120b, 120c, 120d, or 120e is divided and the number of parts into which each receiving group 130a, 130b, 130c, 130d, or 130e is divided, the third voltage may be differently selected.

Also, according to a ratio between the capacitance of the feedback capacitor $C_F$ of the fingerprint recognition receiving circuits 132 and the capacitance of the feedback capacitor $C_F$ of the touch sensing receiving circuits 133 and a ratio between the mutual capacitance in the high resolution touch sensing mode and the mutual capacitance in the low resolution touch sensing mode, the first voltage and the third voltage may be the same. For example, when one transmitting group 120a, 120b, 120c, 120d, or 120e includes eight transmitting lines 121 and one receiving group 130a, 130b, 130c, 130d, or 130e includes eight receiving lines 131 and the capacitance of the feedback capacitor $C_F$ of the touch sensing receiving circuits 133 is selected to be sixteen times the capacitance of the feedback capacitor $C_F$ of the fingerprint recognition receiving circuits 132, the first voltage may be four times the second voltage. Also, when each transmitting group 120a, 120b, 120c, 120d, or 120e is divided into two parts and each receiving group 130a, 130b, 130c, 130d, or 130e is divided into two parts in the high resolution touch sensing mode, the third voltage may be four times the second voltage, to be the same as the first voltage. In this case, the transmitting driver 120 may not include the third voltage line VDDH_M and the control circuit 140 in the high resolution touch sensing mode may connect the first voltage line VDDH_H to the transmitting circuits 122.

The signal output unit 130 may receive touch signals from a first portion of the receiving lines 131 sequentially disposed in each of the receiving groups 130a, 130b, 130c, 130d, and 130e and then may receive touch signals from the remaining receiving lines 131 sequentially disposed in each of the receiving groups 130a, 130b, 130c, 130d, and 130e, in the high resolution touch sensing mode. For example, the signal output unit 130 may simultaneously receive the touch signals from the receiving lines 131 corresponding to an area illustrated as "1" and then may simultaneously receive the touch signals from the receiving lines 131 corresponding to an area illustrated as "2" in FIG. 9.

Figure 12A:
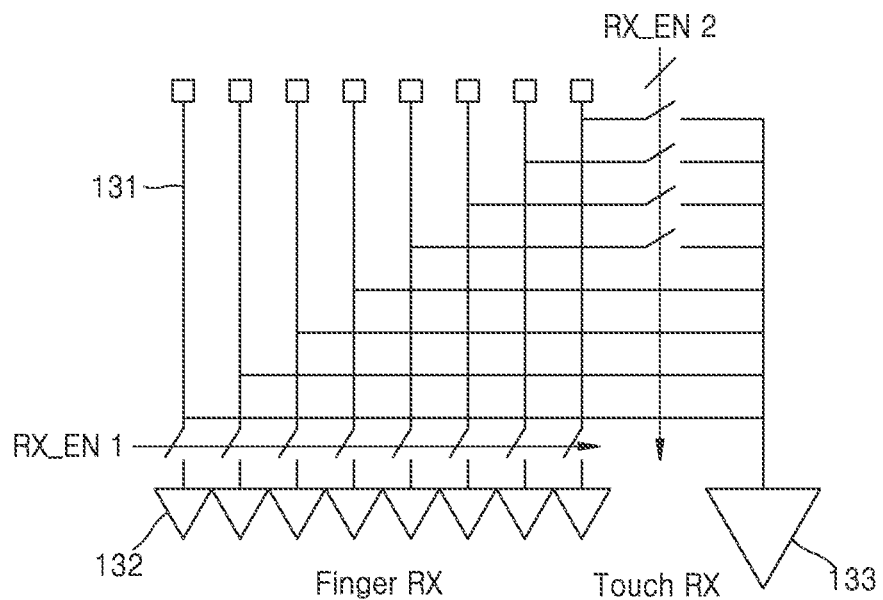

Referring to FIG. 12A, the signal output unit 130 may receive the touch signals by connecting the first portion of the receiving lines 131 sequentially disposed in each receiving group 130a, 130b, 130c, 130d, or 130e to one touch sensing receiving circuit (Touch RX) 133, in the high resolution touch sensing mode. To this end, the control circuit 140 may disconnect all of the fingerprint recognition receiving circuits (Finger RX) 132 in the signal output unit 130 from the receiving lines 131 corresponding thereto, respectively, through a first receiving control signal RX_EN1. Also, the control circuit 140 may connect the receiving lines 131 corresponding to the area illustrated as "1" in FIG. 9 in each receiving group 130a, 130b, 130c, 130d, or 130e to the touch sensing receiving circuit 133, through a second receiving control signal RX_EN2. Then, one touch sensing receiving circuit 133 disposed in one receiving group 130a, 130b, 130c, 130d, or 130e may receive the touch signals from the first portion of the receiving lines 131 sequentially disposed in the corresponding one receiving group 130a, 130b, 130c, 130d, or 130e.

Figure 12B:
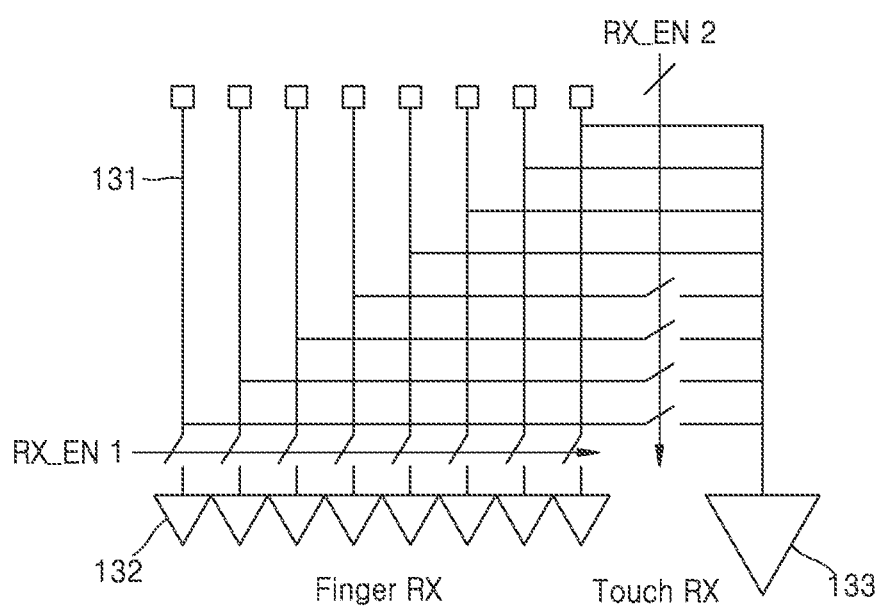

Thereafter, referring to FIG. 12B, the signal output unit 130 may receive the touch signals by connecting a second portion of the receiving lines 131 sequentially disposed in each receiving group 130a, 130b, 130c, 130d, or 130e to one touch sensing receiving circuit (Touch RX) 133. To this end, the control circuit 140 may disconnect the receiving lines 131 corresponding to the area illustrated as "1" in FIG. 9 in each receiving group 130a, 130b, 130c, 130d, or 130e from the touch sensing receiving circuit 133 and may connect the receiving lines 131 corresponding to the area illustrated as "2" in FIG. 9 to the touch sensing receiving circuit 133, through a second receiving control signal RX_EN2. Then, one touch sensing receiving circuit 133 disposed in each receiving group 130a, 130b, 130c, 130d, or 130e may receive the touch signals from the second portion of the receiving lines 131 sequentially disposed in the corresponding receiving group 130a, 130b, 130c, 130d, or 130e.

Figure 13:
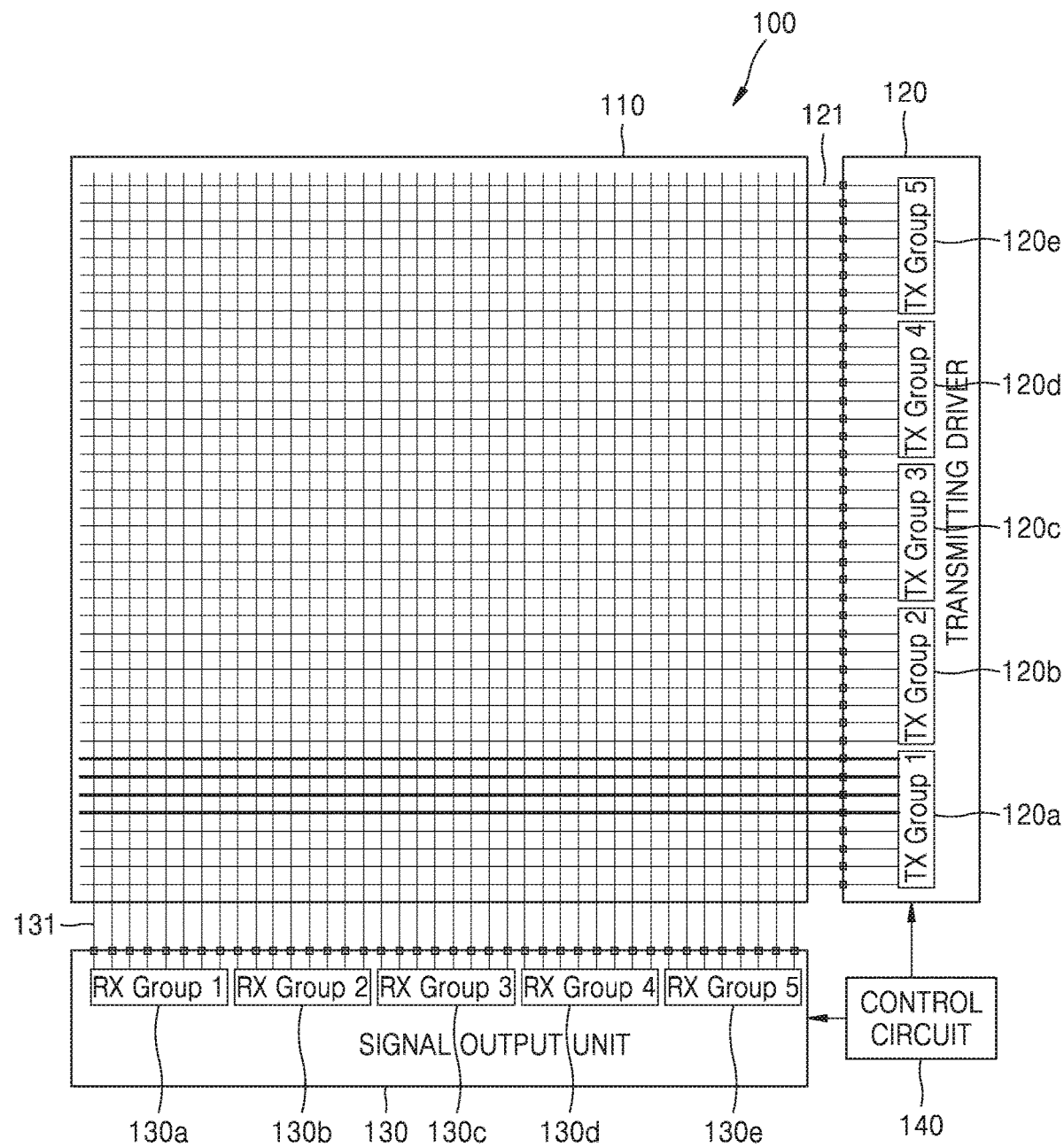
Figure 14:
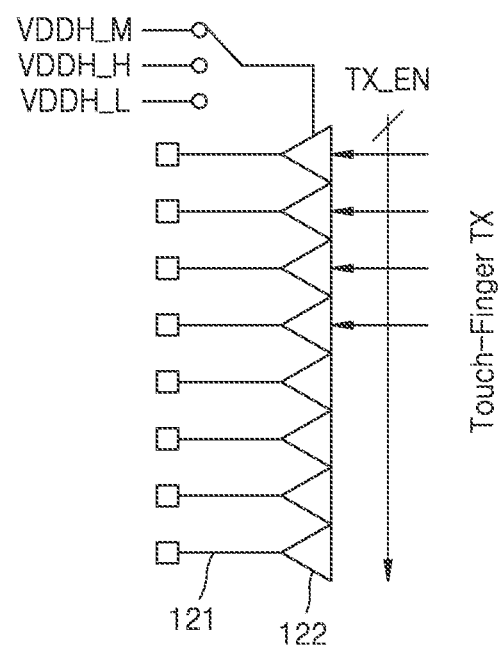

Next, referring to FIG. 13, the transmitting driver 120 may simultaneously apply driving signals to a second portion of the transmitting lines 121 in the first transmitting group 120a and may not apply driving signals to the remaining transmitting lines 121, under control of the control circuit 140. For example, as indicated by a thick solid line in FIG. 13, the driving signals may be simultaneously applied to only the second portion of the transmitting lines 121 sequentially disposed in the first transmitting group 120a. To this end, referring to FIG. 14, a second portion of the transmitting circuits Touch-Finger TX) 122 sequentially disposed in the first transmitting group 120a may be simultaneously activated in response to a transmitting control signal TX_EN of the control circuit 140. Then, the driving signals may be simultaneously applied to the second portion of the transmitting lines 121 connected to the second portion of the transmitting circuits 122 activated in the first transmitting group 120a.

While the driving signals are simultaneously applied to the second portion of the transmitting lines 121 sequentially disposed in the first transmitting group 120a, the signal output unit 130 may receive the touch signals based on the method described with reference to FIGS. 12A and 12B. Based on this method, the high resolution touch sensing mode may be performed by separately applying the driving signals to portions of the transmitting lines 121 until the last transmitting group 120e.

By using the method described in detail, the resolution of the touch sensing operation may be adjusted according to necessity, by variously selecting the groups of the transmitting lines 121 and the receiving lines 131 in the touch sensing mode. Also, the touch sensitivity and the SNR may be constantly maintained regardless of a change in the touch sensing resolution by appropriately changing the driving voltage according to the resolution of the touch sensing operation.

So far, it has been described that the touch signals are received through the fingerprint recognition receiving circuits 132 in the fingerprint recognition mode and the touch signals are received through the touch sensing receiving circuits 133 in the touch sensing mode. However, both in the fingerprint recognition mode and the touch sensing mode, one type of receiving circuit may be used to receive the touch signals.

Figure 15:
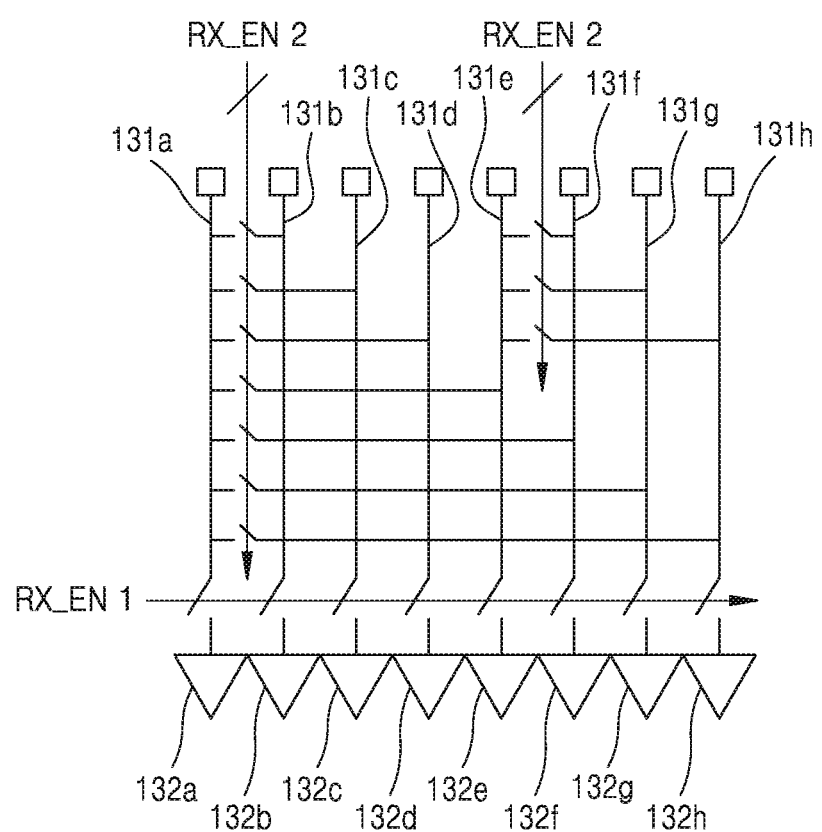
FIG. 15 is a circuit diagram illustrating an example of a structure of receiving circuits disposed in a signal output unit, according to embodiments.

FIG. 15 is a circuit diagram illustrating an example of a structure of a plurality of receiving circuits 132a through 132h disposed in the signal output unit 130, according to embodiments. FIG. 15 illustrates the receiving circuits disposed in one receiving group 130a, 130b, 130c, 130d, or 130e of the signal output unit 130.

Referring to FIG. 15, the signal output unit 130 may include the plurality of first through eighth receiving circuits 132a through 132h corresponding to a plurality of first through eighth receiving lines 131a through 131h, respectively. The first through eighth receiving circuits 132a through 132h may be connected to the first through eighth receiving lines 131a through 131h corresponding thereto, respectively, in response to a first receiving control signal RX_EN1 of the control circuit 140. Also, the second through eighth receiving lines 131b through 131h may be selectively connected to the first receiving line 131a and the sixth through eighth receiving lines 131f through 131h may be selectively connected to the fifth receiving line 131e, in response to a second receiving control signal RX_EN2 of the control circuit 140. The control circuit 140 may control connection between the first through eighth receiving lines 131a through 131h and the first through eighth receiving circuits 132a through 132h, and connection between the first through eighth receiving lines 131a through 131h according to a fingerprint recognition mode, a low resolution touch sensing mode, and a high resolution touch sensing mode, by using the first receiving control signal RX_EN1 and the second receiving control signal RX_EN2.

Figure 16:
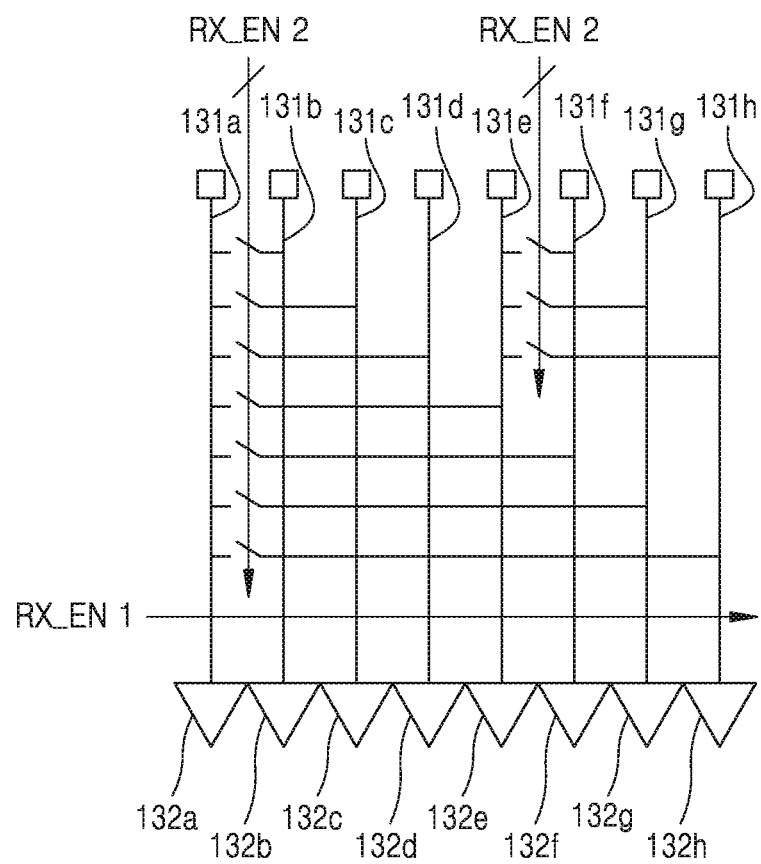
FIGS. 16, 17 and 18 are circuit diagrams illustrating an example of an operation of receiving circuits disposed in a signal output unit, according to embodiments.
Figure 17:
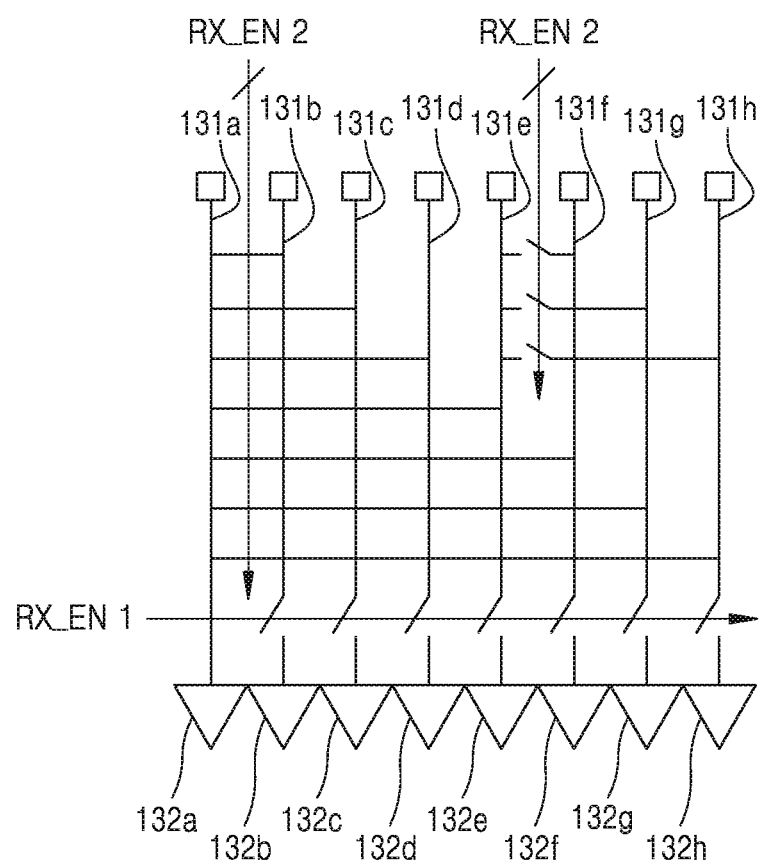
Figure 18:
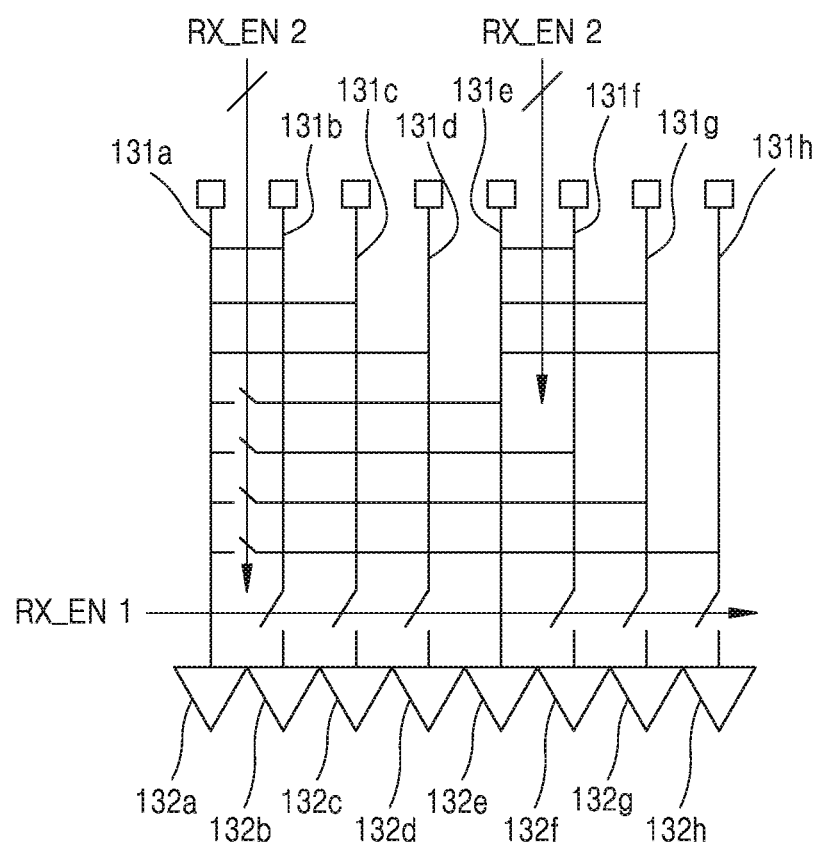

FIGS. 16, 17 and 18 are circuit diagrams illustrating an example of an operation of the first through eighth receiving circuits 132a through 132h disposed in the signal output unit 130, according to embodiments. First, referring to FIG. 16, in the fingerprint recognition mode, the control circuit 140 may connect the first through eighth receiving circuits 132a through 132h to the first through eighth receiving lines 131a through 131h corresponding thereto, respectively, by using the first receiving control signal RX_EN1. Also, the control circuit 140 may disconnect the connection between all of the first through eighth receiving lines 131a through 131h by using the second receiving control signal RX_EN2. Then, the first through eighth receiving circuits 132a through 132h may simultaneously receive touch signals through the first through eighth receiving lines 131a through 131h corresponding thereto, respectively.

Also, referring to FIG. 17, in the low resolution touch sensing mode, the control circuit 140 may connect only the first receiving circuit 132a to the first receiving line 131a and may disconnect the second through eighth receiving circuits 132b through 132h from the second through eighth receiving lines 131b through 131h, respectively, by using the first receiving control signal RX_EN1. Also, the control circuit 140 may connect all of the second through eighth receiving lines 131b through 131h to the first receiving line 131a by using the second receiving control signal RX_EN2. Then, the first receiving circuit 132a connected to the first receiving line 131a may simultaneously receive the touch signals from the first through eighth receiving lines 131a through 131h. Thus, in the low resolution touch sensing mode, the touch signals generated in one receiving group 130a, 130b, 130c, 130d, or 130e may be received through the first receiving circuit 132a.

Referring to FIG. 18, in the high resolution touch sensing mode, the control circuit 140 may connect the first receiving circuit 132a to the first receiving line 131a and connect the fifth receiving circuit 132e to the fifth receiving line 131e by using the first receiving control signal RX_EN1. Then, the control circuit 140 may disconnect the second through fourth and the sixth through eighth receiving circuits 132b through 132d and 132f through 132h from the second through fourth and the sixth through eighth receiving lines 131b through 131d and 131f through 131h, respectively. Also, the control circuit 140 may disconnect the sixth through eighth receiving lines 131*f* through 131*h* from the first receiving line 131*a*, connect the second through fourth receiving lines 131*b* through 131*d* to the first receiving line 131*a*, and connect the sixth through eighth receiving lines 131*f* through 131*h* to the fifth receiving line 131*e*, by using the second receiving control signal RX_EN2.

Then, the first receiving circuit 132*a* connected to the first receiving line 131*a* may simultaneously receive the touch signals from the first through fourth receiving lines 131*a* through 131*d* sequentially disposed and the fifth receiving circuit 132*e* connected to the fifth receiving line 131*e* may simultaneously receive the touch signals from the fifth through eighth receiving lines 131*e* through 131*h* sequentially disposed. Thus, in the high resolution touch sensing mode, the touch signals generated in a first portion of one receiving group 130*a*, 130*b*, 130*c*, 130*d*, or 130*e* may be received by the first receiving circuit 132*a* and the touch signals generated in a second portion of the corresponding receiving group 130*a*, 130*b*, 130*c*, 130*d*, or 130*e* may be received by the fifth receiving circuit 132*e*.

According to these embodiments, the first receiving circuit 132*a* and the fifth receiving circuit 132*e* may simultaneously receive the touch signals generated in different areas in one receiving group 130*a*, 130*b*, 130*c*, 130*d*, or 130*e*. Thus, an operational speed of the high resolution touch sensing mode may be improved. In the embodiments described with reference to FIGS. 9 through 14, the high resolution touch sensing mode having four times the resolution of the low resolution touch sensing mode may take four times the time taken by the low resolution touch sensing mode. However, in the embodiments described with reference to FIGS. 15 through 18, the high resolution touch sensing mode having four times the resolution of the low resolution touch sensing time may take only two times the time taken by the low resolution touch sensing mode.

In the embodiments described with reference to FIGS. 15 through 18, the capacitance of the feedback capacitor $C_F$ in the fingerprint recognition mode may be the same as the capacitance of the feedback capacitor $C_F$ in the touch sensing mode. Thus, the ratio between the first voltage supplied by the first voltage line VDDH_H and the second voltage supplied by the second voltage line VDDH_L may be the same as the ratio between the mutual capacitance in the touch sensing mode and the mutual capacitance in the fingerprint recognition mode.

Figure 19:
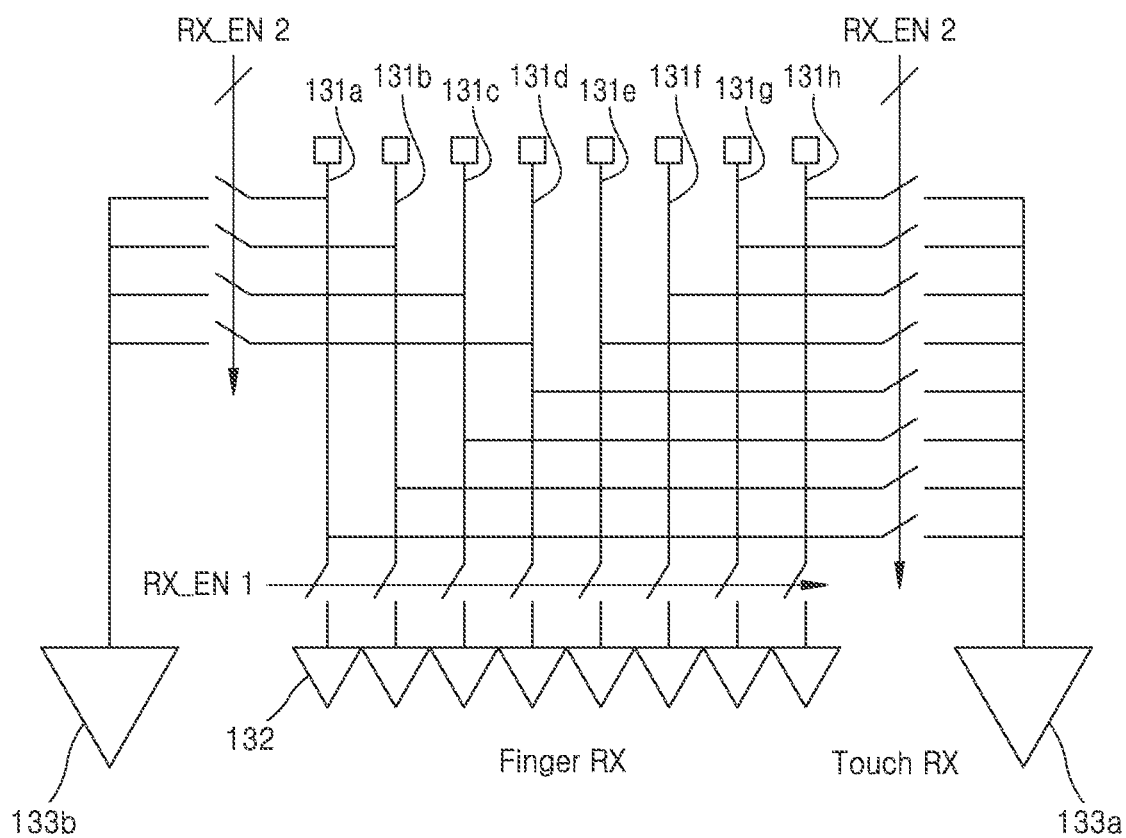
FIG. 19 is a circuit diagram illustrating an example of a structure of receiving circuits disposed in a signal output unit, according to embodiments.

FIG. 19 is a circuit diagram illustrating an example of a structure of a plurality of receiving circuits 132, 133*a* and 133*b* disposed in the signal output unit 130, according to embodiments. FIG. 19 illustrates the plurality of receiving circuits 132, 133*a*, and 133*b* disposed in one receiving group 130*a*, 130*b*, 130*c*, 130*d*, or 130*e* of the signal output unit 130. Referring to FIG. 19, the signal output unit 130 may include the plurality of fingerprint recognition receiving circuits (Finger RX) 132 corresponding to the plurality of first through eighth receiving lines 131*a* through 131*h*, respectively, and the first and second touch sensing receiving circuits (Touch RX) 133*a* and 133*b*. Thus, compared to the embodiments illustrated in FIG. 4, the signal output unit 130 illustrated in FIG. 19 may further include one more touch sensing receiving circuit.

The fingerprint recognition receiving circuits 132 may be connected to the first through eighth receiving lines 131*a* through 131*h* corresponding thereto, respectively, in response to the first receiving control signal RX_EN1 of the control circuit 140. The first touch sensing receiving circuit 133*a* may be selectively connected to the first through eighth receiving lines 131*a* through 131*h* or to the fifth through eighth receiving lines 131*e* through 131*h*, in response to the second receiving control signal RX_EN2 of the control circuit 140. The second touch sensing receiving circuit 133*b* may be selectively connected to the first through fourth receiving lines 131*a* through 131*d* in response to the second receiving control signal RX_EN2 of the control circuit 140. The control circuit 140 may connect the first through eighth receiving lines 131*a* through 131*h* to the fingerprint recognition receiving circuits 132, the first touch sensing receiving circuit 133*a*, or the second touch sensing receiving circuit 133*b*, according to the fingerprint recognition mode, the low resolution touch sensing mode, or the high resolution touch sensing mode, by using the first receiving control signal RX_EN1 and the second receiving control signal RX_EN2.

For example, in the fingerprint recognition mode, the control circuit 140 may connect the fingerprint recognition receiving circuits 132 to the first through eighth receiving lines 131*a* through 131*h* corresponding thereto, respectively, by using the first receiving control signal RX_EN1. Also, the control circuit 140 may disconnect all of the first through eighth receiving lines 131*a* through 131*h* from the first touch sensing receiving circuit 133*a* and disconnect all of the fifth through eighth receiving lines 131*e* through 131*h* and the second touch sensing receiving circuit 133*b*, by using the second receiving control signal RX_EN2.

Figure 20:
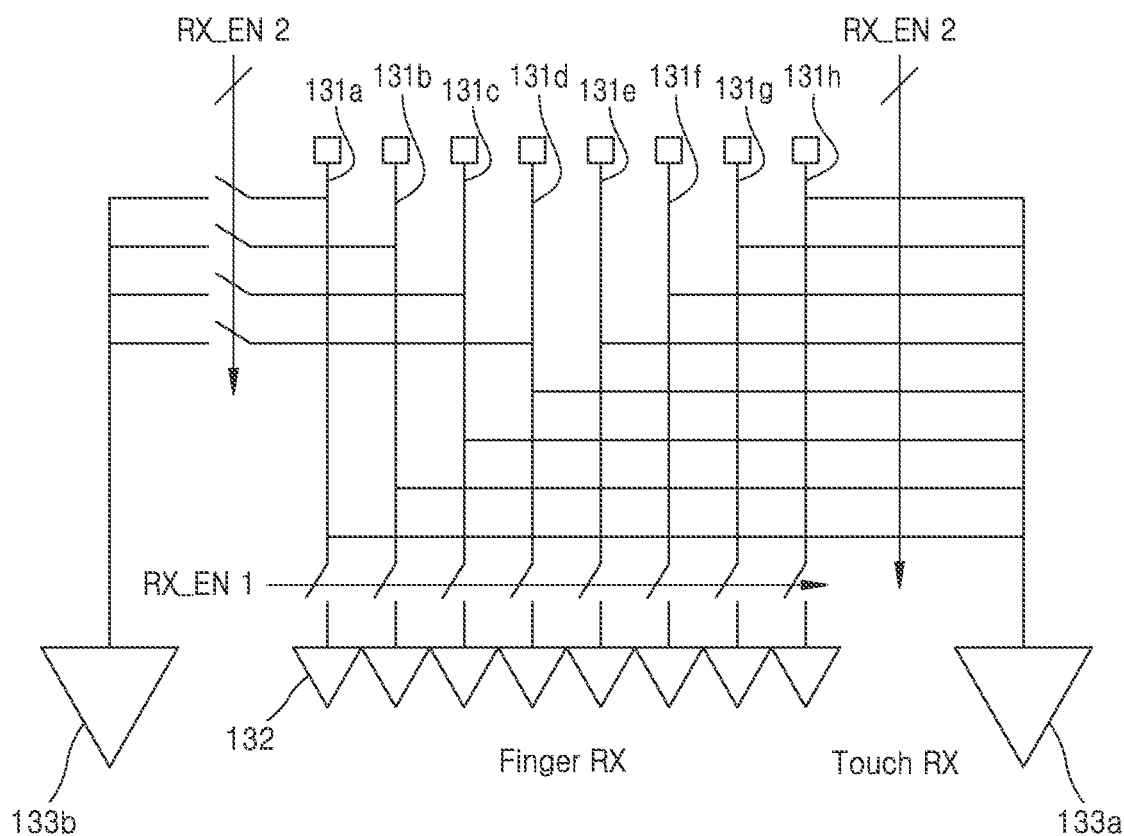
FIGS. 20 and 21 are circuit diagrams illustrating an example of an operation of receiving circuits disposed in a signal output unit, according to embodiments.
Figure 21:
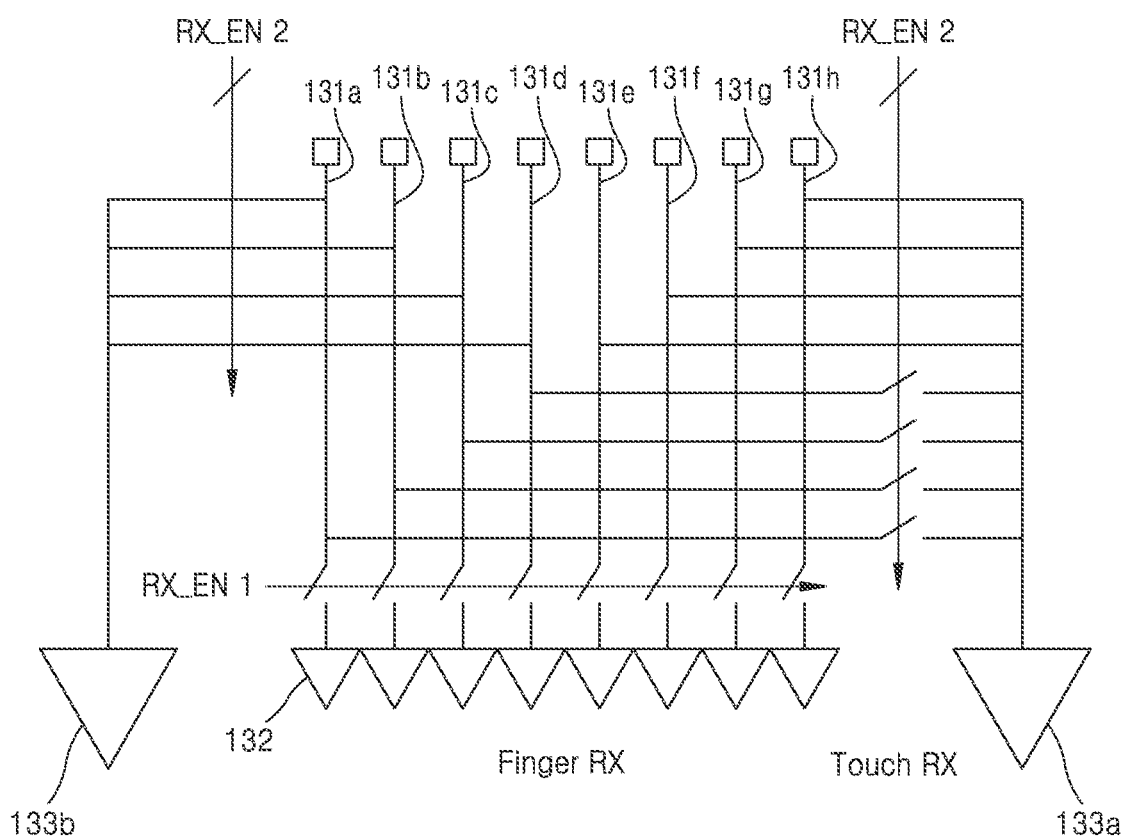

FIGS. 20 and 21 are circuit diagrams illustrating an example of an operation of the plurality of receiving circuits 132, 133*a* and 133*b* disposed in the signal output unit 130, according to embodiments.

Referring to FIG. 20, in the low resolution touch sensing mode, the control circuit 140 may disconnect all of the first through eighth receiving lines 131*a* through 131*h* from the fingerprint recognition receiving circuits (Finger RX) 132 corresponding thereto, respectively, by using the first receiving control signal RX_EN1. Also, the control circuit 140 may connect all of the first through eighth receiving lines 131*a* through 131*h* to the first touch sensing receiving circuit (Touch RX) 133*a* and disconnect the fifth through eighth receiving lines 131*e* through 131*h* from the second touch sensing receiving circuit 133*b*, by using the second receiving control signal RX_EN2. Then, the first touch sensing receiving circuits 133*a* may simultaneously receive the touch signals from the first through eighth receiving lines 131*a* through 131*h*. Thus, in the low resolution touch sensing mode, the touch signals generated in one receiving group 130*a*, 130*b*, 130*c*, 130*d*, or 130*e* may be received by the first touch sensing receiving circuit 133*a*.

Referring to FIG. 21, in the high resolution touch sensing mode, the control circuit 140 may disconnect all of the first through eighth receiving lines 131*a* through 131*h* from the fingerprint recognition receiving circuits (Finger RX) 132 corresponding thereto, respectively, by using the first receiving control signal RX_EN1. Also, the control circuit 140 may connect only the fifth through eighth receiving lines 131*e* through 131*h* sequentially disposed to the first touch sensing receiving circuit (Touch RX) 133*a* and disconnect the first through fourth receiving lines 131*a* through 131*d* from the first touch sensing receiving circuit 133*a*, by using the second receiving control signal RX_EN2. Also, the control circuit 140 may connect the first through fourth receiving lines 131*a* through 131*d* sequentially disposed to the second touch sensing receiving circuit 133*b*. Then, the first touch sensing receiving circuit 133*a* may simultaneously receive the touch signals from the fifth through eighth receiving lines 131*e* through 131*h* and the second touch sensing receiving circuit 133b may simultaneously receive the touch signals from the first through fourth receiving lines 131a through 131d.

In the embodiments illustrated in FIGS. 19 through 21, in the high resolution touch sensing mode, the touch signals generated in a first portion of one receiving group 130a, 130b, 130c, 130d, or 130e may be received by the first touch sensing receiving circuit 133a. Simultaneously, the touch signals generated in a second portion of one receiving group 130a, 130b, 130c, 130d, or 130e may be received by the second touch sensing receiving circuit 133b. Thus, according to these embodiments, the high resolution touch sensing mode having four times the resolution of the low resolution touch sensing time may take only two times the time taken by the low resolution touch sensing mode.

Also, in the embodiments described with reference to FIGS. 19 through 21, the capacitance of the feedback capacitor $C_F$ in the fingerprint recognition mode and the capacitance of the feedback capacitor $C_F$ of the touch sensing mode may be different from each other. Thus, the ratio between the first voltage supplied by the first voltage line VDDH_H and the second voltage supplied by the second voltage line VDDH_L may be determined by taking into account the capacitance of the feedback capacitor $C_F$ of the fingerprint recognition receiving circuits 132 and the capacitance of the feedback capacitor $C_F$ of the first and second touch sensing receiving circuits 133a and 133b.

The touch sensor 100 described in detail may be applied to various electronic apparatuses, such as smart phones, smart watches, tablet PCs, laptop computers, televisions (TVs), personal digital assistants (PDAs), portable multimedia players (PMP), etc.

Figure 22:
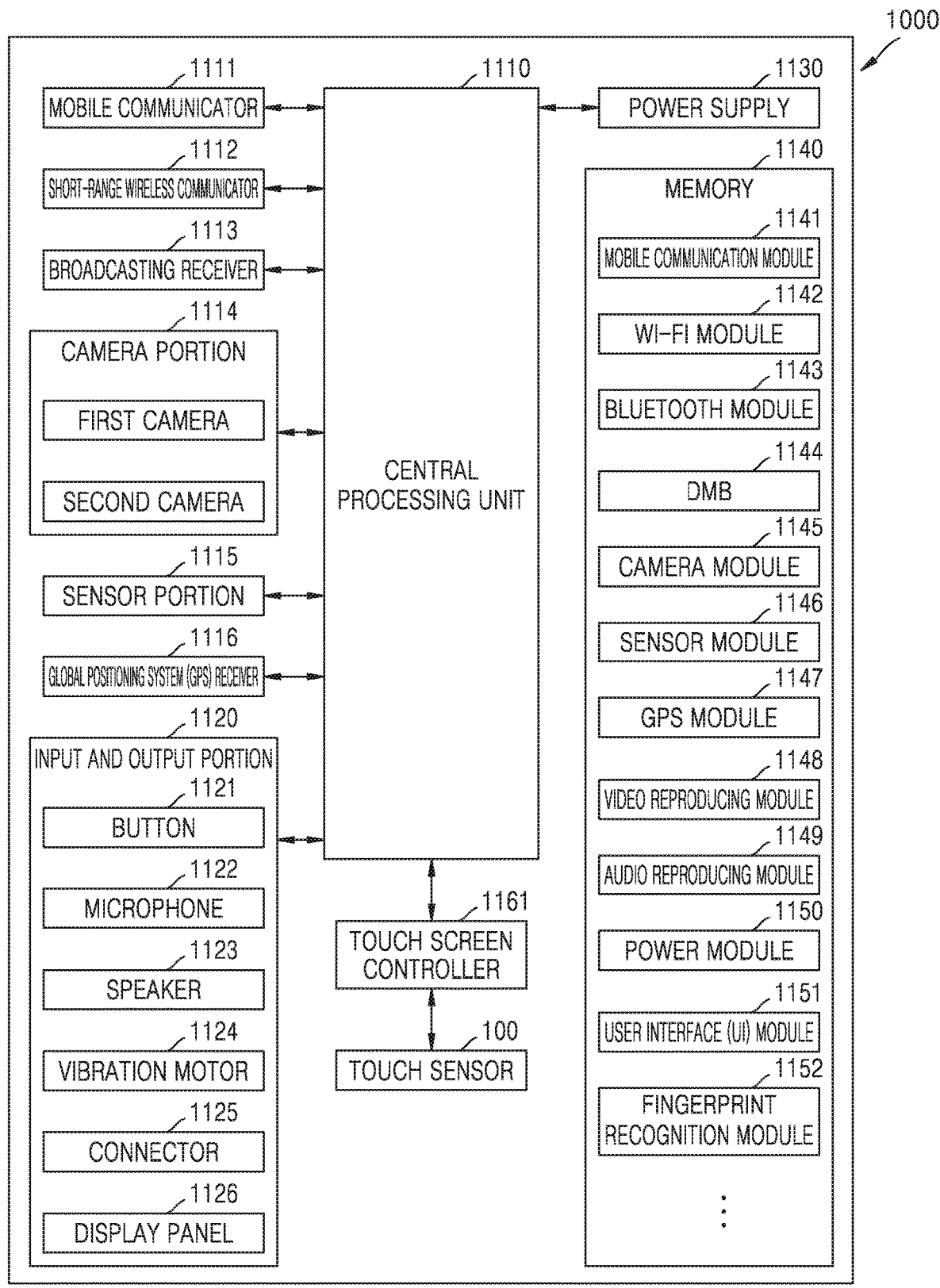
FIG. 22 is a block diagram illustrating an example of a structure of an electronic apparatus including a touch sensor, according to embodiments.

FIG. 22 is a block diagram illustrating an example of a structure of an electronic apparatus 1000 including the touch sensor 100, according to embodiments. Referring to FIG. 22, the electronic apparatus 1000 may include, for example, a central processing unit 1110, a mobile communicator 1111, a short-range wireless communicator 1112, a broadcasting receiver 1113, a camera portion 1114, a sensor portion 1115, a global positioning system (GPS) receiver 1116, an input and output portion 1120, a power supply 1130, a memory 1140, etc. Here, the "portion" may be a hardware component and/or a software component executed by the hardware component.

The mobile communicator 1111 may transceive wireless signals with any one or any combination of a base station, an external terminal, and a server in a mobile communication network. Here, the wireless signals may include a sound call signal, a video telephony call signal, or various forms of data according to transmittance and reception of text/multimedia messages. The short-range wireless communicator 1112 may perform functions for short-range wireless communication. The short-range wireless communicator 1112 may include a Bluetooth communicator, a Bluetooth low energy (BLE) communicator, a near field communicator, A WLAN (Wi-Fi) communicator, a Zigbee communicator, an infrared data association (IrDA) communicator, a Wi-Fi direct (WFD) communicator, an ultra wideband (UWB) communicator, an Ant+ communicator, etc., but is not limited thereto.

The broadcasting receiver 1113 may receive DMB broadcasting signals. The camera portion 1114 may include lenses and optical devices configured to capture a picture or a video. The sensor portion 1115 may include, for example, a gravity sensor configured to sense motions of the electronic apparatus 1000, an illuminance sensor configured to sense brightness of light, a proximity sensor configured to sense proximity of a human being, a motion sensor configured to sense motion of a human being, etc. The GPS receiver 1116 may receive GPS signals from artificial satellites. By using these GPS signals, various services may be provided to a user.

Also, the input and output portion 1120 may provide an interface with respect to an external device or a user, and may include a button 1121, a microphone 1122, a speaker 1123, a vibration motor 1124, a connector 1125, a display panel 1126, etc. The power supply 1130 may be connected to a battery or an external power source to supply power to the electronic apparatus 1000.

The memory 1140 may store various programs executed by the central processing unit 1110. The central processing unit 1110 may control programs stored in the memory 1140 or operations of the other components described in detail. The programs stored in the memory 1140 may be divided into a plurality of modules according to functions thereof. For example, the modules may include a mobile communication module 1141, a Wi-Fi module 1142, a Bluetooth module 1143, a DMB module 1144, a camera module 1145, a sensor module 1146, a GPS module 1147, a video reproducing module 1148, an audio reproducing module 1149, a power module 1150, a user interface (UI) module 1151, a fingerprint recognition module 1152, etc.

The electronic apparatus 1000 may further include the touch sensor 100 and a touch screen controller 1161. The touch sensor 100 may be disposed above a display panel 1126 or may be integrally manufactured with the display panel 1126. The touch screen controller 1161 may control operations of the transmitting driver 120 and the signal output unit 130 of the touch sensor 100 in interconnection with the control circuit 140 of the touch sensor 100. The touch screen controller 1161 may be integrally formed with the control circuit 140 of the touch sensor 100 in the electronic apparatus 1000 or may be software installed in the electronic apparatus 1000.

In a state in which it is pre-set that a user is to perform user authentication via fingerprinting recognition, when the electronic apparatus 1000 requires user authentication, the touch screen controller 1161 may convert the operation of the touch sensor 100 into a fingerprint recognition mode. For example, when user authentication is required to cancel a screen lock state of the electronic apparatus 1000, the fingerprint recognition mode may be started. Alternatively, the fingerprint recognition mode may be started also when user authentication is required to perform on-line banking, online payment, etc. using the electronic apparatus 1000. When the fingerprint recognition mode is started, the central processing unit 1110 may execute, for example, the fingerprint recognition module 1152, and the fingerprint recognition module 1152 may control the transmitting driver 120 and the signal output unit 130 via the touch screen controller 1161. Thus, the electronic apparatus 1000 may perform the fingerprint recognition for user authentication only by a user's fingerprint contact on the display panel 1126. Thus, because it is not required to mount an additional fingerprint sensor, a space for the fingerprint sensor may be spared.

When a touch operation is performed, such as selecting a screen area on the display panel 1126 or scrolling a screen, the touch screen controller 1161 may convert the operation of the touch sensor 100 into a low resolution touch sensing mode. Also, when a user executes a writing and inputting program through which the user may write and input letters or numbers by a touch operation, the touch screen controller 1161 may convert the operation of the touch sensor 100 into a high resolution touch sensing mode.

The fingerprint recognition touch sensor and the electronic apparatus including the same described in detail are described with reference to the embodiments illustrated in the drawings. However, the embodiments are only examples and it would be understood by one of ordinary skill in the art that various modifications and equivalent embodiments are possible based on the embodiments. Therefore, the disclosed embodiments have to be understood in a descriptive sense rather than a limiting sense. The scope of the disclosure is described in the claims rather than the descriptions above, and all differences within the range corresponding thereto shall be interpreted as being included in the claims.

What is claimed is:

1. A touch sensor comprising:
    a plurality of parallel transmitting lines extending in a first direction;
    a signal output circuit comprising a plurality of parallel receiving lines extending in a second direction crossing the first direction, and configured to receive touch signals through the plurality of parallel receiving lines;
    a transmitting driver configured to:
        in a fingerprint recognition mode, apply first driving signals of a first voltage, to the plurality of transmitting lines;
        in a low resolution touch sensing mode, apply second driving signals of a second voltage, to the plurality of transmitting lines, the second voltage being different than the first voltage; and
        in a high resolution touch sensing mode, apply third driving signals of a third voltage, to the plurality of transmitting lines, the third voltage being lower than the first voltage and higher than the second voltage.

2. The touch sensor of claim 1, wherein the transmitting driver comprises a plurality of transmitting groups disposed in the second direction, and
    wherein each of the plurality of transmitting groups comprises adjacent ones of the plurality of transmitting lines.

3. The touch sensor of claim 2, wherein the transmitting driver is further configured to:
    in the fingerprint recognition mode, sequentially apply one of the first driving signals of the first voltage, to each of the plurality of transmitting lines;
    in the low resolution touch sensing mode, sequentially apply the second driving signals of the second voltage, to each of the plurality of transmitting groups;
    in the high resolution touch sensing mode, apply the third driving signals of the third voltage, to first ones of the plurality of transmitting lines that are sequentially disposed in one of the plurality of transmitting groups, and then apply the third driving signals of the third voltage to second ones of the plurality of transmitting lines that are sequentially disposed in the one of the plurality of transmitting groups.

4. The touch sensor of claim 3, wherein the plurality of transmitting groups comprise a first transmitting group and a second transmitting group adjacent to the first transmitting group, and
    wherein the transmitting driver is further configured to, in the low resolution touch sensing mode, apply the second driving signals of the second voltage simultaneously to first ones of the plurality of transmitting lines that are disposed in the first transmitting group, and then apply the second driving signals of the second voltage simultaneously to the second ones of the plurality of transmitting lines that are disposed in the second transmitting group.

5. The touch sensor of claim 3, wherein the transmitting driver comprises:
    a plurality of transmitting circuits connected to the plurality of transmitting lines, respectively;
    a first voltage line configured to supply the first voltage to the plurality of transmitting circuits;
    a second voltage line configured to supply the second voltage to the plurality of transmitting circuits; and
    a third voltage line configured to supply the third voltage to the plurality of transmitting circuits.

6. The touch sensor of claim 5, wherein the transmitting driver is further configured to:
    in the fingerprint recognition mode, connect the first voltage line to the plurality of transmitting circuits;
    in the low resolution touch sensing mode, connect the second voltage line to the plurality of transmitting circuits; and
    in the high resolution touch sensing mode, connect the third voltage line to the plurality of transmitting circuits.

7. The touch sensor of claim 6, wherein the transmitting driver is further configured to:
    in the fingerprint recognition mode, sequentially and separately activate the plurality of transmitting circuits;
    in the low resolution touch sensing mode, simultaneously activate first ones of the plurality of transmitting circuits that are disposed in the one of the plurality of transmitting groups; and
    in the high resolution touch sensing mode, simultaneously activate second ones of the plurality of transmitting circuits that are connected to the first ones of the plurality of transmitting lines in the one of the plurality of transmitting groups, and then simultaneously activate third ones of the plurality of transmitting circuits that are connected to the second ones of the plurality of transmitting lines.

8. The touch sensor of claim 3, wherein the signal output circuit comprises a plurality of receiving groups disposed in the first direction, and
    wherein each of the plurality of receiving groups comprises adjacent ones of the plurality of parallel receiving lines.

9. The touch sensor of claim 8, wherein the signal output circuit comprises:
    a plurality of first receiving circuits disposed to correspond to the plurality of parallel receiving lines, respectively; and
    a plurality of second receiving circuits,
    wherein each of the plurality of second receiving circuits is disposed to correspond to a respective one of the plurality of receiving groups.

10. The touch sensor of claim 9, wherein the signal output circuit is further configured to, in the fingerprint recognition mode:
    connect the plurality of parallel receiving lines respectively to the plurality of first receiving circuits; and
    simultaneously receive the touch signals through all of the plurality of first receiving circuits respectively connected to the plurality of parallel receiving lines.

11. The touch sensor of claim 10, wherein the signal output circuit is further configured to, in the low resolution touch sensing mode:
    connect ones of the plurality of parallel receiving lines that are disposed in one of the plurality of receiving groups to one of the plurality of second receiving circuits corresponding to the one of the plurality of receiving groups; and receive the touch signals through the one of the plurality of second receiving circuits connected to the ones of the plurality of parallel receiving lines.

12. The touch sensor of claim 11, wherein the signal output circuit is further configured to, in the high resolution touch sensing mode, receive the touch signals by connecting first ones of the plurality of parallel receiving lines that are sequentially disposed in one of the plurality of receiving groups, to one of the plurality of second receiving circuits corresponding to the one of the plurality of receiving groups, and then receive the touch signals by connecting second ones of the plurality of parallel receiving lines that are sequentially disposed in the one of the plurality of receiving groups, to the one of the plurality of second receiving circuits corresponding to the one of the plurality of receiving groups.

13. The touch sensor of claim 9, wherein each of the plurality of first receiving circuits comprises a first feedback capacitor having a first capacitance, and
wherein each of the plurality of second receiving circuits comprises a second feedback capacitor having a second capacitance greater than the first capacitance.

14. The touch sensor of claim 3, wherein the signal output circuit comprises a plurality of receiving groups disposed in the first direction,
wherein each of the plurality of receiving groups comprises adjacent ones of the plurality of parallel receiving lines, and
wherein the signal output circuit further comprises:
a plurality of first receiving circuits disposed to correspond to the plurality of parallel receiving lines, respectively;
a second receiving circuit disposed to correspond to first ones of the plurality of parallel receiving lines that are sequentially disposed in each of the plurality of receiving groups; and
a third receiving circuit disposed to correspond to second ones of the plurality of parallel receiving lines that are sequentially disposed in each of the plurality of receiving groups.

15. The touch sensor of claim 14, wherein the signal output circuit is further configured to, in the high resolution touch sensing mode, receive the touch signals by connecting the first ones of the plurality of parallel receiving lines sequentially disposed in each of the plurality of receiving groups, to the second receiving circuit, while receiving the touch signals by connecting the second ones of the plurality of parallel receiving lines sequentially disposed in each of the receiving groups, to the third receiving circuit.

16. The touch sensor of claim 3, wherein the signal output circuit comprises a plurality of receiving groups disposed in the first direction,
wherein each of the plurality of receiving groups comprises adjacent ones of the plurality of parallel receiving lines, and
wherein the signal output circuit comprises a plurality of receiving circuits disposed to correspond to the plurality of parallel receiving lines, respectively.

17. The touch sensor of claim 16, wherein the signal output circuit is further configured to:
in the fingerprint recognition mode, connect the plurality of parallel receiving lines respectively to the plurality of receiving circuits, and simultaneously receive the touch signals through all of a plurality of first receiving circuits respectively connected to the plurality of parallel receiving lines;
in the low resolution touch sensing mode, receive the touch signals by connecting first ones of the plurality of parallel receiving lines that are disposed in one of the plurality of receiving groups, to any first one of the plurality of receiving circuits in the one of the plurality of receiving groups; and
in the high resolution touch sensing mode, receive the touch signals by connecting second ones of the plurality of parallel receiving lines that are sequentially disposed in the one of the plurality of receiving groups, to any second one of the plurality of receiving circuits in the one of the plurality of receiving groups, and connecting third ones of the plurality of parallel receiving lines that are sequentially disposed in the plurality of receiving groups, to another one of the plurality of receiving circuits in the one of the plurality of receiving groups.

* * * * *